United States Patent [19]
Yokokawa

[11] Patent Number: 5,879,864
[45] Date of Patent: Mar. 9, 1999

[54] IMAGE FORMING METHOD

[75] Inventor: Takuya Yokokawa, Kanagawa, Japan

[73] Assignee: Fuji Photo Film Co., Ltd., Ashigarara, Japan

[21] Appl. No.: 883,441

[22] Filed: Jun. 26, 1997

[30] Foreign Application Priority Data

Jun. 27, 1919 [JP] Japan ..................................... 8-167978

[51] Int. Cl.$^6$ ....................................................... G03C 5/16
[52] U.S. Cl. ........................ 430/350; 430/203; 430/944; 355/81
[58] Field of Search ..................................... 430/350, 614, 430/617, 203, 944; 355/81, 106, 30, 27, 28

[56] References Cited

U.S. PATENT DOCUMENTS

| | | | |
|---|---|---|---|
| 4,500,626 | 2/1985 | Naito et al. . | |
| 5,716,775 | 2/1998 | Ushara et al. | 430/611 |
| 5,717,451 | 2/1998 | Katano et al. | 347/242 |

FOREIGN PATENT DOCUMENTS

| | | |
|---|---|---|
| 4-51043 | 2/1992 | Japan . |
| 4-249244 | 9/1992 | Japan . |
| 7-234371 | 9/1995 | Japan . |
| WO95/31754 | 11/1995 | WIPO . |

*Primary Examiner*—Thorl Chea
*Attorney, Agent, or Firm*—Burns, Doane, Swecker & Mathis, LLP

[57] ABSTRACT

An image forming method comprising the steps of: rotating a drum having wound thereon a heat developable light-sensitive material which comprises a support having thereon at least a light-sensitive silver halide emulsion, a binder and a dye-donating compound; exposing said light-sensitive material with an exposure head comprising a plurality of beam light sources which are arranged at a predetermined interval along a sub-scanning direction perpendicular to a main scanning direction in which the drum is rotated, to correspond to a plurality of exposure points, respectively, and each of which emits light having the same wavelength each other; and moving said exposure head in said sub-scanning direction by 1/N (N is an integer of 2 or more) of the length of the arrangement of said beam light sources, to effect a scanning exposure of said light-sensitive material in steps of a plurality of exposure points.

8 Claims, 12 Drawing Sheets

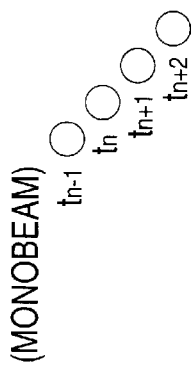
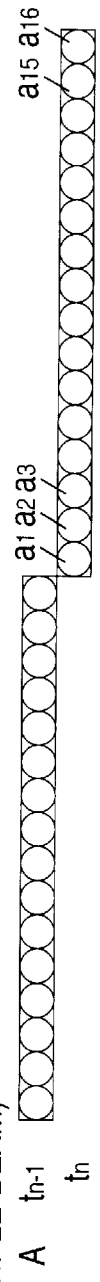
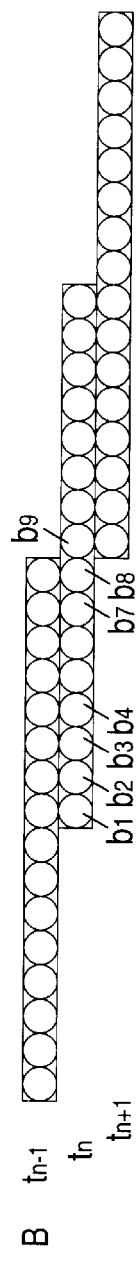
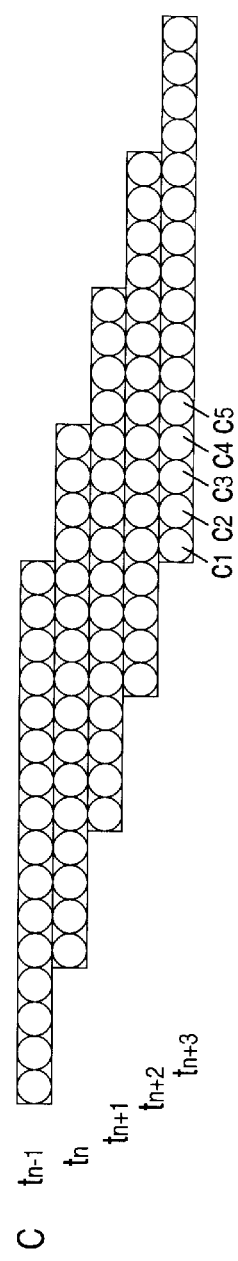
FIG. 3-1 (MONOBEAM)
FIG. 3-2 (MULTIPLE-BEAM) A
FIG. 3-3 B
FIG. 3-4 C

IMAGE FORMING METHOD

FIELD OF THE INVENTION

The present invention relates to an image forming method using a heat developable light-sensitive material, and particularly to a method for exposing a heat developable light-sensitive material.

BACKGROUND OF THE INVENTION

The heat developable light-sensitive materials are known in the art, and the heat developable light-sensitive materials and processes thereof are described, for example, in *Shashin Kohqaku no Kiso (Higinen Shashin)* (The Fundamentals of Photographic Engineering (Nonsilver Photograph)), pages 242 to 255 (1982), Corona Publishing Co. Ltd and U.S. Pat. No. 4,500,626.

In addition, methods for forming dye images, for example, by the coupling reaction of oxides of developing agents and couplers are described in U.S. Pat. Nos. 3,761,270 and 4,021,240. Further, methods for forming positive color images by the light-sensitive silver dye bleaching process are described in U.S. Pat. No. 4,235,957 and the like.

Furthermore, a method has recently been proposed in which a diffusive dye is imagewise released or formed by heat development and the diffusive dye is transferred onto a dye fixing element. According to this method, either a negative dye image or a positive dye image can be obtained by changing the kind of dye-donating compound used or the kind of silver halide used. Further details thereof are described in U.S. Pat. Nos. 4,500,626, 4,483,914, 4,503,137 and 4,559,290, JP-A58-149046 (the term "JP-A" as used herein means an "unexamined published Japanese patent application"), JP-A-60-133449, JP-A-59-218443, JP-A-61-238056, EP-A-220746A2, JIII Journal of Technical Disclosure No. 87-6199 and EP-A-210660 (A2).

Also for methods for obtaining positive color images by heat development, many methods have been proposed. For example, U.S. Pat. No. 4,559,290 proposes a method of allowing a compound obtained by converting a so-called DRR compound to an oxide type having no color image releasing ability to coexist with a reducing agent or a precursor thereof, oxidizing the reducing agent by heat development in accordance with the exposure amount of a silver halide, and reducing the oxidized compound with the remaining reducing agent not oxidized, thereby permitting a diffusive dye to be released. Further, EP-A-220746A and JIII Journal of Technical Disclosure No. 87-6199 (Vol. 12, No. 22) describe heat developable color light-sensitive materials using compounds which releases diffusive dyes by reductive cleavage of N—X bonds (wherein X represents an oxygen atom, a nitrogen atom or a sulfur atom) as compounds which releases diffusive dyes by a similar mechanism.

In general, in the exposure of heat developable light-sensitive materials having a size exceeding A3, the so-called outer drum system exposure is usually employed in which light-sensitive materials are exposed while being wrapped around a drum, because it is difficult to transport the material with plane conveyance. However, the outer drum system exposure providing high resolution has the problem of time consuming. In order to solve this problem, it is proposed to increase the number of revolution of a drum. However, this is liable to causes the problem that it becomes difficult to fix light-sensitive materials to the drum, causing an increase in cost, that the exposure time per exposure point decreases so that the resulting sensitivity or gradation becomes unfavorable, that the developing speed reduces, or that the exposure temperature dependency increases.

On the other hand, as a method for decreasing the exposure time, there is the multiple-beam exposure method of exposing a plurality of exposure points at once. In this exposure method, it is possible to decrease the whole exposure time while decreasing the number of revolution of a drum. In the multiple-beam exposure, a multiple exposure effect of different time intervals as compared with other exposure points is given at exposure points at both ends in an arranged direction of multiple beams from the exposure of the exposure points adjacent to an exposure point to which attention is given. In this exposure method, an exposure head having a plurality of beam light sources is used for obtaining the multiple beams.

Further, a method of arranging exposure beams in a manner different from the conventional one to conduct the so-called interleave system exposure, thereby decreasing the difference in exposure history is described in *IS & T's International Congress on Advances in Non-Impact Printing Technologies*, page 337 (1994).

The overlapping of exposure beams and the effect of multiple exposure are described in PCT International Publication No. 95/31754 and JP-A-4-51043, which are inventions for monobeam exposure and make no reference to the problems which arise by multiple exposure at all.

Further, JP-A-2-18548 reports that changes in photographic characteristics caused by multiple exposure in scanning exposure are reduced by doping a silver halide emulsion with a heavy metal, but does not mention the problems which arise by multiple exposure at all.

JP-A-7-234371 reports an image forming apparatus for controlling the overlapping of light beams to inhibit the uneven density due to multiple exposure effect in scanning exposure using a monobeam, but is silent on the problems which caused by multiple channel exposure using multiple beams.

JP-A-4-249244 discloses an improvement in a developing solution as a method for inhibiting deterioration of the photographic characteristics which occurs in conducting scanning exposure having high illuminance and an overlap of a short period of time, but describes no improvement by an exposure method and makes no reference to multiple channel exposure at all.

SUMMARY OF THE INVENTION

An object of the present invention is to obtain at least one of the following effects by changing an exposure method of a heat developable light-sensitive material from conventional methods:

(1) Prevention of exposure streaks developed by multiple-beam exposure;

(2) Reduction in exposure temperature dependency; and (3) Reduction in exposure range by (1) and/or (2).

Other objects and effects of the present invention will become apparent from the description of the specification.

The above objectives of the present invention have been achieved by providing an image forming method comprising the steps of:

rotating a drum having wound thereon a heat developable light-sensitive material which comprises a support having thereon at least a light-sensitive silver halide emulsion, a binder and a dye-donating compound;

exposing said heat developable light-sensitive material with an exposure head comprising a plurality of beam light sources which are arranged at a predetermined interval along a sub-scanning direction perpendicular to a main scanning direction in which the drum is rotated, to correspond to a plurality of exposure points, respectively, and each of which emits light having the same wavelength each other; and moving said exposure head in said sub-scanning direction by 1/N of the length of the arrangement of said beam light sources, wherein N is an integer of 2 or greater to effect a scanning exposure of said heat developable light-sensitive material in steps of a plurality of exposure points.

In a preferred embodiment, the light-sensitive material comprises at least one layer light-sensitive to an infrared wavelength region of 700 nm to 900 nm.

BRIEF DESCRIPTION OF THE DRAWINGS

FIGS. 3-1 is a diagram showing the feed of a monobeam exposure head;

FIGS. 3-2 is a diagram showing the feed of a multiple-beam exposure head driven according to a conventional image forming method;

FIGS. 3—3 and 3-4 each is a diagram showing the feed of a multiple-beam exposure head driven according to the image forming method of the present invention;

FIGS. 4(a) and 4(b) show exposure profiles of monobeam exposure patterns;

DETAILED DESCRIPTION OF THE INVENTION

Figure 1:
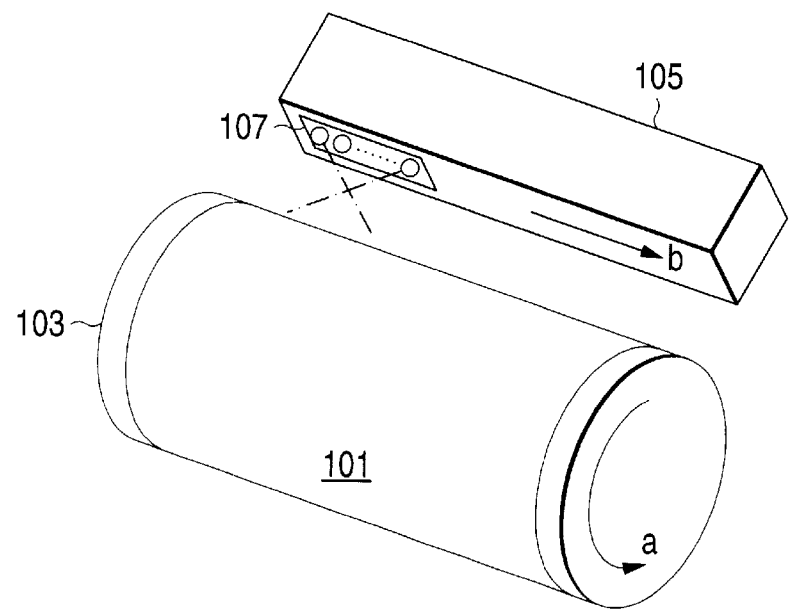
FIG. 1 is a perspective view showing an exposure unit to which an image forming method of the present invention is applied.

The relationship between main scanning and sub-scanning in an exposure method for use in the present invention is described below. The term "main scanning direction (main scanning)" means a direction in which a drum is rotated, and the term "sub-scanning direction (sub-scanning)" means the axial direction of the drum, namely the direction vertical to the main scanning. Basically, the main scanning is conducted by continuous rotation of the drum. The sub-scanning is usually performed by continuous movement of the exposure head. In some cases, however, intermittent movement in synchronization with the main scanning may be employed using a pulse motor or the like. Although exposure and the movement are usually carried out at the same time, it is also possible to conduct exposure and the movement alternately in some cases.

The term "multiple beams" in the present invention indicates that a plurality of light sources are used for exposure. In order to decrease the time required for exposing a large-sized area at high resolution (the time required for exposing the entire surface, sometimes simply referred to as the exposure time), it is important that the plurality of exposure light sources are arranged in the sub-scanning direction. That is, if N light sources are disposed which can concurrently expose N picture elements in the sub-scanning direction and each of the picture elements is exposed only once under the same conditions (the number of revolution of a drum, the exposure density, the picture element density and the sub-scanning speed), the whole exposure time is decreased to 1/N, as compared with the case in which one light source is used.

The image forming method of the present invention is characterized by a method of exposing a light-sensitive material. A technical background thereof and the method of the present invention for solving the problems are described below.

Exposure Streaks

The term "exposure streaks" used herein means peculiar streak-like image defects developed when the entire surface of a light-sensitive material is uniformly exposed to light by multiple-beam exposure irradiating beam light to a plurality of exposure points. Multiple beams linearly arranged generate sensitizing or desensitizing streaks having a period of the width of arrangement of the multiple beams. The causes of the streak development are roughly classified into three types as follows.

First, the streaks are developed owing to ununiformity in light intensity, wavelength or modulation characteristics in exposure of the plural beams. The streaks developed due to this cause can be prevented by correction of a LUT (Look Up Table) controlling the exposure amount of multiple channels.

Second, the streaks are developed due to insufficient movement accuracy of sub-scanning or insufficient rotation accuracy of a drum, or when the relationship between the speed of movement and the number of revolution of the drum is not precisely controlled. In other words, the streaks are developed by non-uniform exposure energy (in spite of intended uniform exposure) on a surface of the light-sensitive material. That is, in some cases, the exposure amount at exposure points at both ends in an arranged direction of the multiple beams is more (when exposure is overlapped) or less (in extreme cases, the speed of movement is too high, so that spacings of exposure are generated) than at the other exposure points. Also for this second cause, mechanical or electrical correction is possible.

Thirdly, sensitization or desensitization occurs due to the characteristics of silver halides to develop the streak-like defects on the image, although equal exposure energy is physically given onto the surface of the light-sensitive material. The present invention mainly solves the problem of the streaks developed owing to the third cause.

This phenomenon occurs due to the large diameter of the exposure beam to wright rather than the size of the exposure point.

That is, the exposure energy to an exposure point to which attention is given amounts to the sum of light energy (Emain) from a channel exposing the exposure point to which attention is given and light energy (Enext) which is light energy leaking to the exposure point to which attention is given of light energy exposing the exposure points adjacent to the exposure point to which attention is given. For example, when the movement amount of sub-scanning is the same as the length of arrangement of multiple beams, light energy (Emain) and light energy (Enext) are given at the same time (with no time delay) at exposure points other than the exposure points at both ends in an arranged direction of the multiple channels. On the other hand, a time delay is caused between light energy (Emain) and light energy (Enext) at the exposure points at both ends in the arranged direction of the multiple channels. This time delay causes difference in sensitivity in spite of exposure with the same light energy, resulting in development of the exposure streaks.

Such characteristics of silver halides are called the intermittent exposure effect, which is a phenomenon known in the art. The intermittent exposure effect is described, for example, in T. H. James, *The Theory of the Photographic Process*, the fourth edition, page 142. The intermittent exposure effect of high illuminance is also studied in *Journal of Imaging Science and Technology*, 37, 117–129 (1993).

The beam light source for use in the present invention includes those comprising a light source common to a plurality of exposure points and further having a shutter for intercepting light in an optical path from the light source to a surface of a light-sensitive material, as well as a light source emitting light by itself such as a semiconductor laser. The degree of the intermittent exposure effect generally depends on the exposure illuminance.

According to the present invention, the above described problem of the exposure streaks is solved by adjusting the movement amount, per revolution of a drum, of an exposure head in a sub-scanning direction to 1/N (N is an integer of 2 or more) the length of arrangement of beam light sources, and exposing (Emain) each exposure point twice or more.

More preferably, the movement amount, per revolution of a drum, of an exposure head in a sub-scanning direction is 1/N (N is an integer of 4 or more) the length of arrangement of beam light sources, and each exposure point is exposed (Emain) four times or more.

In the present invention, the maximum value of the number (N) of the multiple beams in the sub-scanning direction is not limited. It is considered to be determined by a designer of a system, depending upon the maximum size of a light-sensitive material to be exposed, the productivity and the cost of hardware (light sources, engineering systems and control circuits). For example, the suitable number is considered to be about 1000 for an exposure apparatus for a paper size of A0. However, the present invention is not limited thereto.

Like this, the influence of exposure (Enext) of the adjacent exposure points can be decreased by increasing the number of times of exposure (Emain). The term "influence" as used herein means the ratio of exposure (Enext) to the whole quantity of light and the occurrence of a time delay in exposure (Enext) according to the position of multiple channels. That is, it is preferred that the difference in a profile of an exposure amount to a time for which exposure is given is small between the respective exposure points corresponding to the both end sections and the remaining middle section in the length of arrangement of the multiple beams.

The term "multiple exposure" as used in the present invention includes not only exposure repeated plural times to the same one exposure point, but also includes exposure from a light source corresponding to the adjacent exposure points in a sub-scanning direction. In the present invention, exposure of exposure points adjacent to each other in a main scanning direction is not taken into account as the effect of the multiple exposure, because the interval of the multiple exposure is a very short time in the order of a time approximately equal to an exposure time of one exposure point (in the case of intensity modulation) or a maximum exposure time (in the case of time modulation), and because all of the exposure points are subjected to the equivalent influence thereof.

Of the effects achieved by the present invention, the exposure temperature dependency and the exposure range are described below in detail.

Exposure Temperature Dependency

Many improvements in exposure temperature dependency of heat developable light-sensitive materials have previously been reported. In particular, this is an important characteristic for color light-sensitive materials, because the disturbance of color balance is more liable to be observed. Especially, for light-sensitive materials each having the maximum value of spectral sensitivity in the infrared region (from 700 nm to 900 nm), it is difficult to improve this exposure temperature dependency. Further, light-sensitive materials each allowed to form a J-band in the infrared region are poor in exposure temperature dependency, so that an improvement thereof is required. Means for solving these problems are reported in JP-A-5-294070, JP-A-6-295044 and JP-A-8-146577.

Under these circumstances, the present inventors have discovered that the exposure temperature dependency can be significantly improved by changing the interval of multiple exposure and the number of times thereof. That is, the present inventors have discovered that when the interval of multiple exposure is 2 msec to 1000 msec, and preferably 10 msec to 400 msec, the exposure temperature dependency is reduced. Further, the present inventors have discovered that when the number of times of multiple exposure is 2 or more, and preferably 4 or more, the exposure temperature dependency is reduced. In general, the degree of the exposure temperature dependency largely depends on the exposure illuminance in exposure (one-time exposure) having no multiple exposure effect.

Reduction in Exposure Range

Methods for modulating the exposure amount include intensity modulation methods changing the exposure intensity at a definite exposure time and time modulation methods modulating the exposure time at a definite exposure intensity.

The term "exposure range" means the range within which the exposure amount can be variable, and the range of the exposure amount which quantity can be indicated as the density. When modulation is directly performed with a semiconductor laser, the range depends on the response characteristics of the semiconductor laser and the characteristics of an electric circuit for controlling it. Further, when exposure is conducted with a combination of a continuous light-emitting source common to multiple-beam channels and a shutter for each channel, the range largely depends on the characteristics of this shutter. In the case of intensity modulation, time modulation or multiple channels by any systems, it is advantageous in terms of design of hardware and cost to narrow the exposure range, because the control range can be narrowed.

When exposure is conducted with a combination of the continuous light-emitting source common to multiple-beam channels and the shutter for each channel, it is possible to intentionally high-frequency modulate this continuous light emission for decreasing the influence of mode hopping.

In order to obtain high quality images (particularly, in color prints), it is important to stably conduct appropriate exposure, and hardware is required to have the function of correcting the individual difference in the sensitivity of light-sensitive materials. For performing this correction, the method of changing the central value of the emitted light quantity of the light source (increasing or decreasing current when the light source is an LD) or the method of controlling the light quantity with a filter can be used in the case of intensity modulation. However, automatic calibration corresponding to sensitivity is convenient for users to operate more easier. In particular, in the case of time modulation, the emitted light quantity is difficult to be controlled. In order to conduct such an automatic sensitivity correction (automatic control of the exposure amount), hardware is required to previously have an exposure range in the correction range, in addition to the exposure range for gradation exposure.

Further, correction of various changes in sensitivity and exposure amount such as correction of the in-plane exposure amount caused by multiple-beam exposure, correction of the exposure temperature and humidity dependency of light-sensitive materials and correction of changes in exposure amount due to hardware are required. That is, the exposure range requires correction of variations between lots of light-sensitive materials, and changes in sensitivity and gradation caused by aging, correction of exposure temperature dependency, correction of sensitivity by the multiple exposure effect of the exposure points at both ends of the multiple beams, or correction of changes in illuminance or light-emitting wavelength due to deterioration of an exposure light source such as the semiconductor laser, as well as a requirement to have at least the minimum range which can express the gradation of the light-sensitive materials. The enlargement of the exposure range due to the above described reasons is a serious burden in designing hardware.

Under these circumstances, the image forming method of the present invention which reduces the correction of the exposure points at both ends in the direction of arrangement of the multiple beams and the correction of the exposure temperature dependency to the difference of the above-described multiple exposure effect is advantageous to design of hardware.

In terms of the design of hardware, it is more advantageous, in frequent cases, to control the exposure amount by time modulation, as compared to controlling by intensity modulation. As described above, however, the exposure time (illuminance) dependency is observed in the multiple exposure effect and the exposure temperature dependency. Accordingly, in the case of time modulation control in which there exists a difference between the time required for exposing a highlighted gradation area (low density area) and the time required for exposing a shadowed gradation area (high density area), it is more difficult to decrease development of the exposure streaks caused by multiple beams and the exposure temperature dependency.

Embodiments of the present invention are explained with reference to the attached drawings.

FIG. 1 shows an exposure unit used for use in the present invention. A light-sensitive material 101 is fixed to a surface of a drum 103 to the inside of which negative pressure is applied. A stage 105 arranged opposite to the drum 103 is provided with an exposure head 107 which conducts scanning movement in a direction (a direction indicated by b in the drawing; a sub-scanning direction) crossing a direction of rotation of the drum 103 (a direction indicated by a in the drawing; a main scanning direction) at right angles. The exposure head 107 comprises a plurality of beam light sources such as LEDs arranged in the sub-scanning direction, each having the same wavelength.

Figure 2:
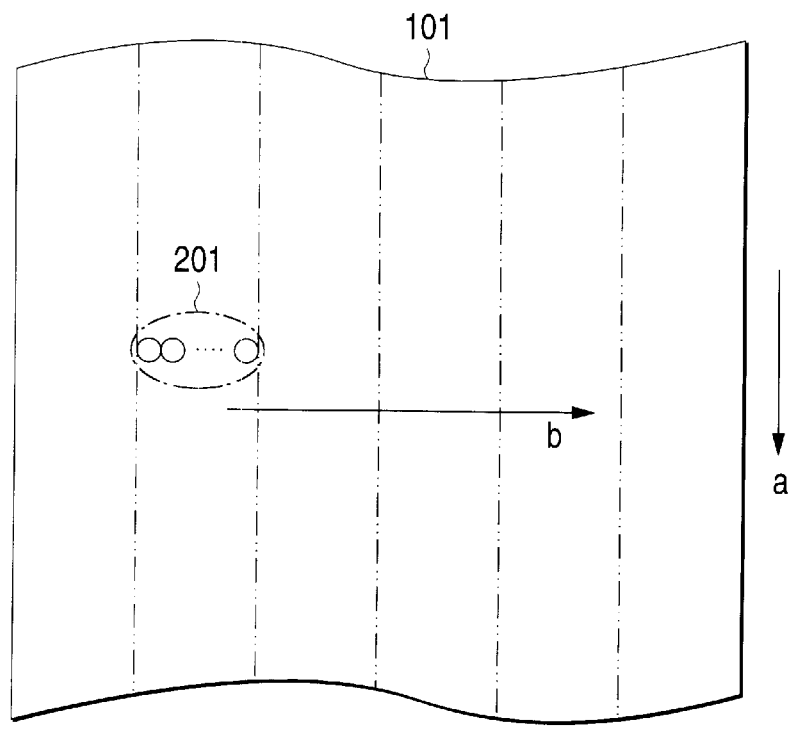
FIG. 2 is a view for illustrating exposure by the exposure unit shown in FIG. 1.

As shown in FIG. 2, the light-sensitive material 101 is irradiated through a lens system not shown in the drawing with multiple beams 201 emitted from the respective light sources of the exposure head 107.

Figure 4:
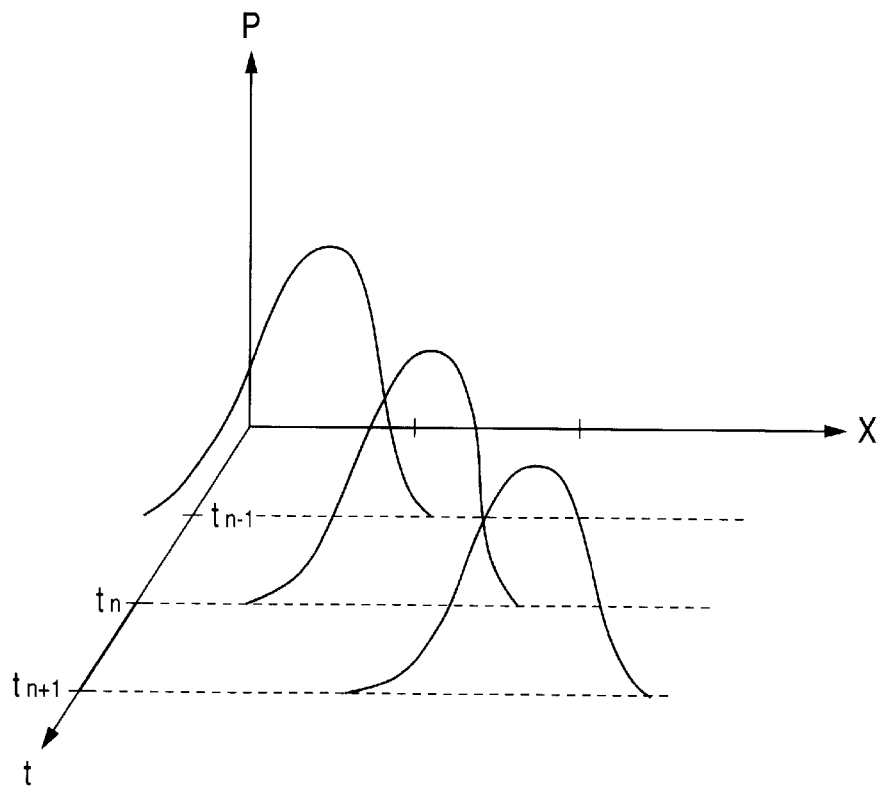
Figure 4:
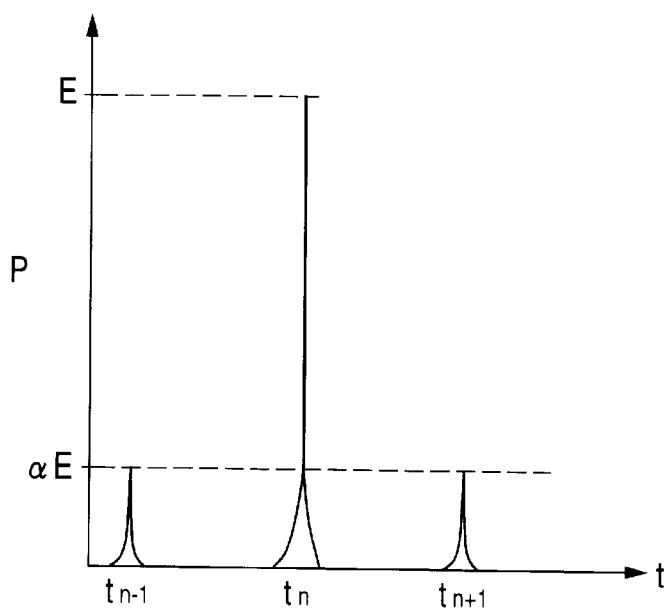

FIG. 3 schematically shows the movement of the exposure head per revolution of the drum. In the drawing, $t_{n-1}$, $t_n$, $t_{n+1}$, $t_{n+2}$ and $t_{n+3}$ represent the positions of the exposure head at n−1, n, n+1, n+2 and n+3 revolutions, respectively. The movements of the exposure head for multiple-beam exposure patterns B and C shown in FIGS. 3—3 and 3–4, respectively, are according to the present invention. For comparison, movements of the exposure head for a mono-beam exposure pattern and for a conventional multiple-beam exposure pattern A are shown in FIG. 3-1 and FIG. 3-2, respectively. The channel number of the exposure head is shown as 16 channels for convenience.

As shown in FIG. 3-2, in conventional multiple-beam exposure pattern A, the exposure head is allowed to move for each the channel number (16 ch), namely by the length of arrangement of the multiple beam light sources, in the sub-scanning direction. In contrast, in multiple-beam exposure pattern B of the present invention shown in FIG. 3—3, the exposure head is allowed to move for each ½ the channel number (16 ch) of the beam light sources, namely by ½ the length of arrangement of the beam light sources, in the sub-scanning direction. In multiple-beam exposure pattern C of the present invention shown in FIGS. 3–4, the exposure head is allowed to move for each ¼ the channel number (16 ch) of the beam light sources, namely by ¼ the length of arrangement of the beam light sources, in the sub-scanning direction.

The respective exposure patterns shown in FIG. 2 are explained with reference to FIGS. 4 to 16 below.

Referring to FIG. 4(a) shows profiles of exposure amounts (the relations of illuminance P, position x and time t), and (b) shows profiles of exposure amounts at a certain exposure position. As shown in FIG. 4(a), times $t_{n-1}$, $t_n$ and $t_{n+1}$ each elapses for each revolution of the drum, and exposure is carried out at different positions for each time. The exposure amount at a certain exposure position is composed of exposure (Emain) according to the exposure amount E at time $t_n$ and exposure (Enext) according to the exposure amount $\alpha E$ (0<α<1) at times $t_{n-1}$ and $t_{n+1}$ before and after time $t_n$, as shown in FIG. 4(b). That is, the exposure amount at a certain exposure position is composed of the exposure amount E and the exposure amount $\alpha E$ according to leakage from the adjacent positions.

Further, conventional multiple-beam exposure pattern A, and multiple-beam exposure patterns B and C of the present invention are described with reference to Table 1.

Table 1 indicates exposure conditions in both end sections and a middle section for exposure patterns A, B and C, in terms of the total exposure amount (Et), the exposure amount of common parts (Ec), the exposure amount of uncommon parts (Eu), the ratio of the exposure amount of uncommon parts to the total exposure amount (Eu/Et), the exposure multiplicity showing the number of times of exposure in the middle section and both end sections (middle section: Ic, end section: Ie), and the ratios of the exposure multiplicity in the middle section and that in the end sections to the exposure multiplicity of the common parts (Ic/I and Ie/I).

TABLE 1

| Exposure Pattern | A | B | | C | |
|---|---|---|---|---|---|
| Total Exposure Amount: (Et) | E + 2αE | 2E + 4αE | | 4E + 8αE | |
| Exposure Amount of Common Parts: (Ec) | E + αE | 2E + 2αE | 2E + 3αE | 4E + 6αE | 4E + 7αE |
| Exposure Amount of Uncommon Parts: (Eu) | αE | 2αE | αE | 2αE | αE |
| Eu/Et | α/(1 + 2α) | α/(1 + 2α) | α/(2 + 4α) | α/(1 + 2α) | α/(4 + 8α) |
| Multiplicity (Mid Section: Ic, End: Ie) | 1, 2 | 2, 3 | | 4, 5 | |
| Multiplicity of Common Parts: (I) | 1 | 2 | | 3 | |
| Ic/I, Ie/I | 1, 2 | 1, 1.5 | | 1, 1.25 | |

Figure 5:
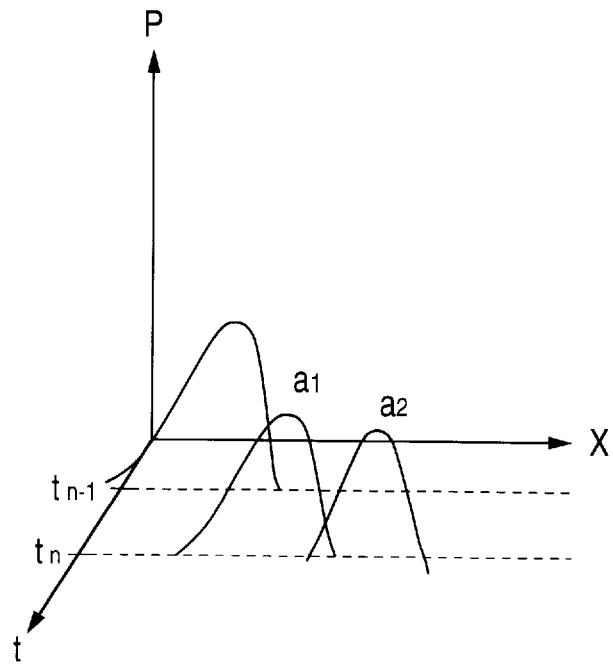
FIGS. 5(a) and 5(b) show exposure profiles at an end section of conventional multiple-beam exposure pattern A.
Figure 5:
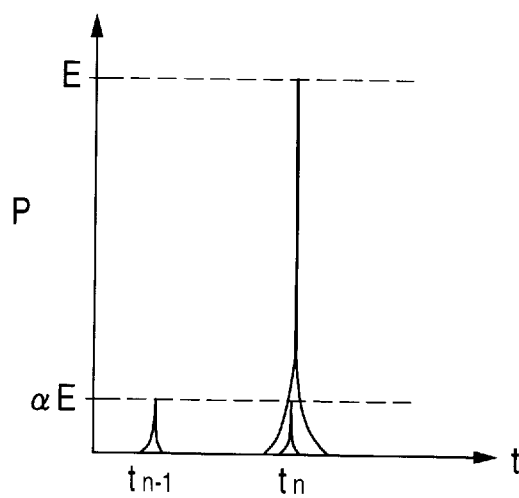

FIGS. 5 to 8 show conventional multiple-beam exposure pattern A. FIG. 5 correspond to exposure points a1 (the exposure point which is at least once exposed (Emain) by the left end light source of the multibeam exposure head; hereinafter referred to a "left end section") and a2 in conventional multiple-beam exposure pattern A shown in FIG. 3-2, FIG. 6 correspond to exposure points a2, a3 and a4 (each is the exposure point which is exposed (Emain) only by non-end light sources (middle light sources) of the multibeam exposure head; hereinafter referred to a "middle section") therein, and FIG. 7 correspond to exposure points a15 and a16 (the exposure point which is at least once exposed (Emain) by the right end light source of the multibeam exposure head; hereinafter referred to a "right end section") therein. In each figures, (a) and (b) show profiles of exposure amounts and profiles of exposure amounts at a certain exposure position, respectively, in a similar manner to FIG. 4.

Figure 6:
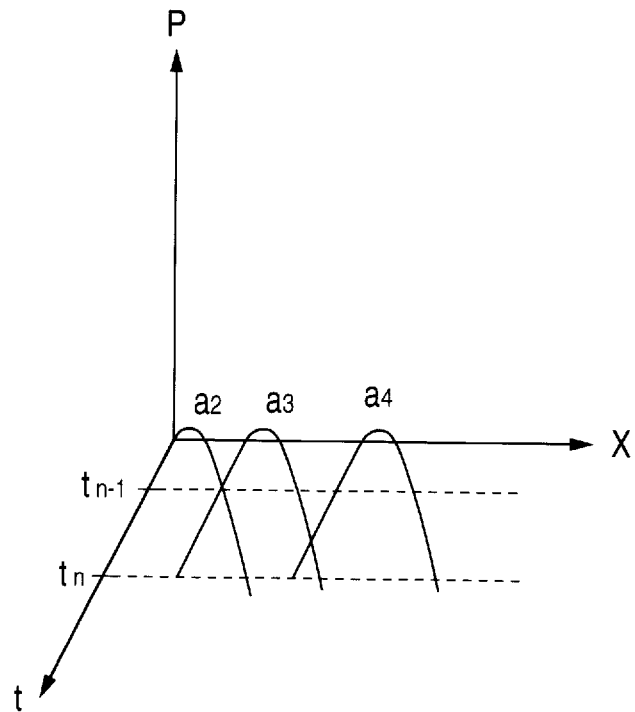
FIGS. 6(a) and 6(b) show exposure profiles at a middle section of conventional multiple-beam exposure pattern A.
Figure 6:
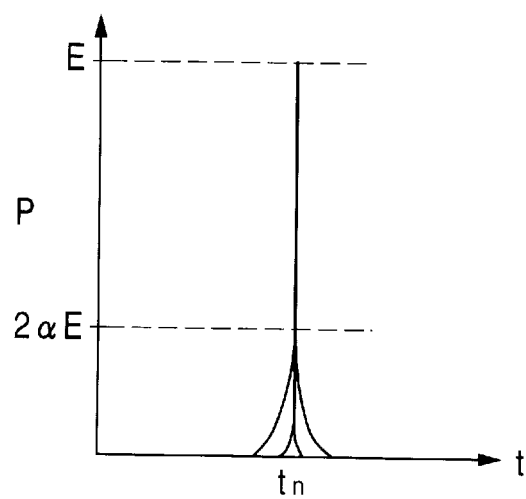
Figure 7:
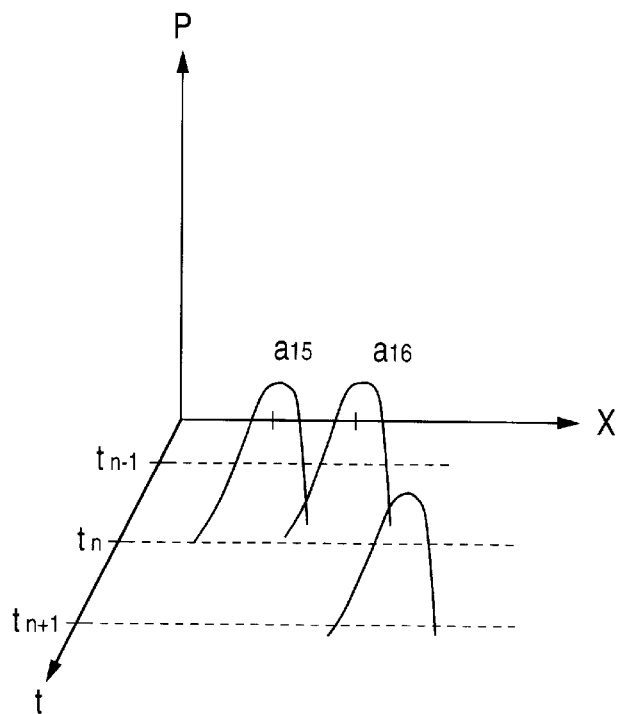
FIGS. 7(a) and 7(b) show exposure profiles at an end section of conventional multiple-beam exposure pattern A.
Figure 7:
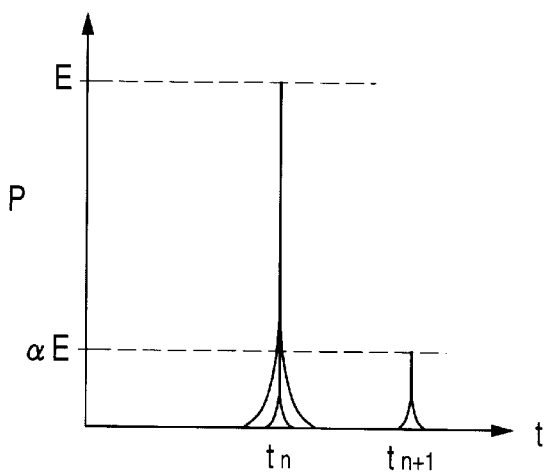
Figure 8:
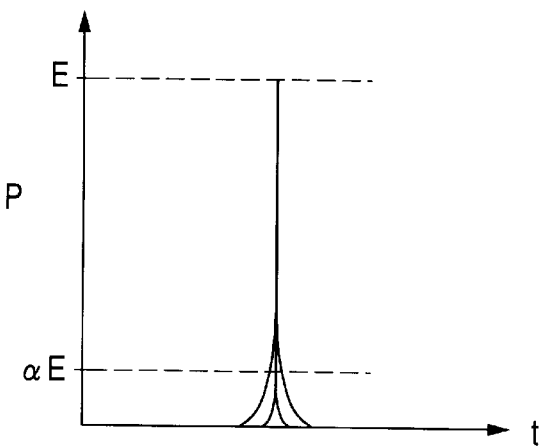
FIG. 8 shows the parts common to the exposure profiles shown in FIGS. 5(b) to 7(b)

FIG. 8 indicates common parts of the profiles of exposure amounts shown in FIGS. 5 to 7. That is, the profiles of exposure amounts at exposure point a1 are exposure amount αE at time $t_{n-1}$ and exposure amount E+αE at time $t_n$, as shown in FIG. 5(b), the profile of an exposure amount at exposure point a3 is exposure amount E+2αE at time $t_n$, as shown in FIG. 6(b), and the profiles of exposure amounts at exposure point a16 are exposure amount E+αE at time $t_n$ and αE at time $t_{n+1}$, as shown in FIG. 7(b). Accordingly, the exposure amount (Ec) of the common parts of the profiles of respective exposure amounts becomes E+αE.

Further, the total exposure amount (Et) at each of exposure points a1, a3 and a16 is E+2αE. The exposure amount of uncommon parts (Eu) of the profiles of exposure amounts at respective exposure points is a difference between the total exposure amount Et=(E+2αE) and the exposure amount of common parts Ec=(E+αE), resulting in (E+2αE) −(E+αE)=αE. Furthermore, the ratio of the exposure amount of uncommon parts (Eu) to the total exposure amount (Et) becomes αE/(E+2αE)=α/(1+2α). The exposure multiplicity in the mid section Ic and that in the end sections Ie become 1 and 2, respectively. The exposure multiplicity in the common parts I becomes 1. In addition, the ratios of the exposure multiplicity in the middle section Ic and that in the end sections Ie to the exposure multiplicity of the common sections I becomes 1/1=1 and 2/1=2, respectively.

Figure 9:
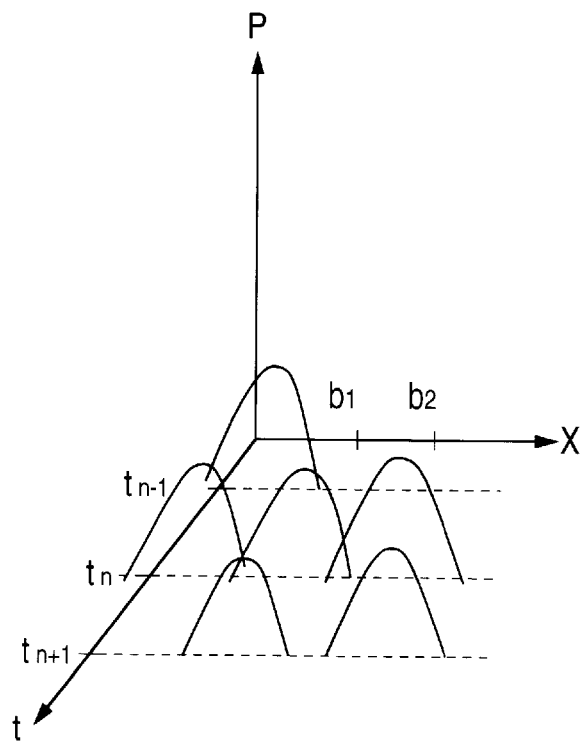
FIGS. 9(a) and 9(b) show exposure profiles at an end section of multiple-beam exposure pattern B of the present invention.
Figure 9:
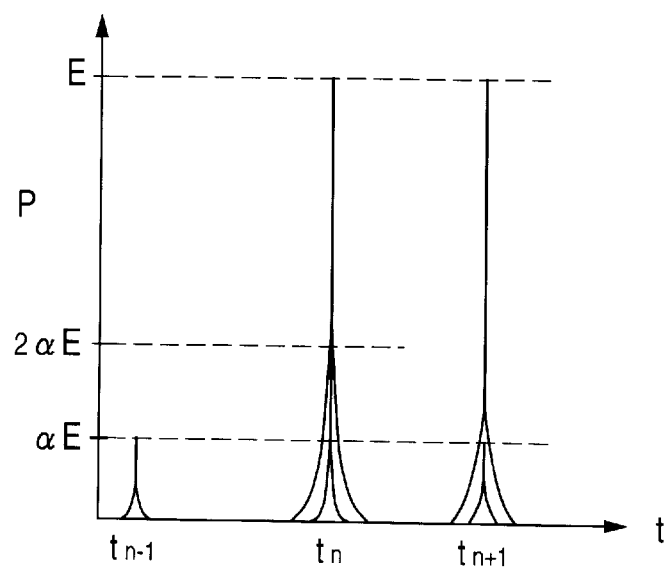
Figure 10:
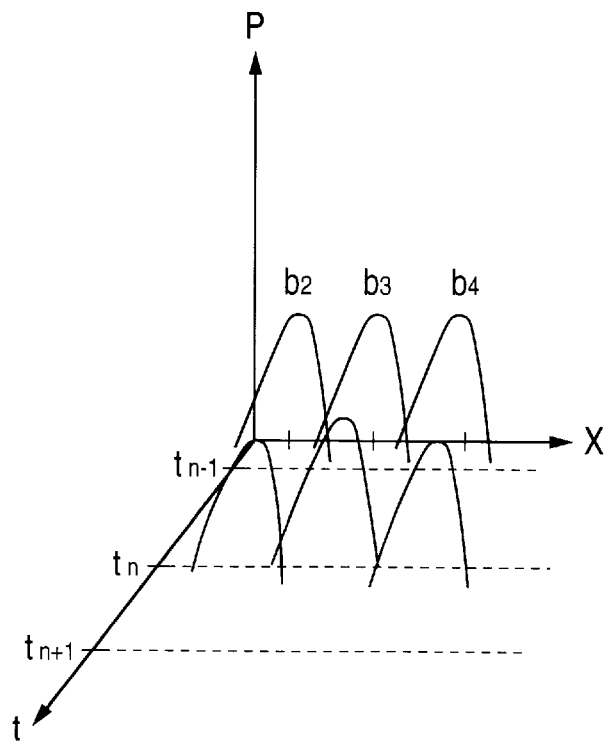
FIGS. 10(a) and 10(b) show exposure profiles at a middle section of multiple-beam exposure pattern B of the present invention.
Figure 10:
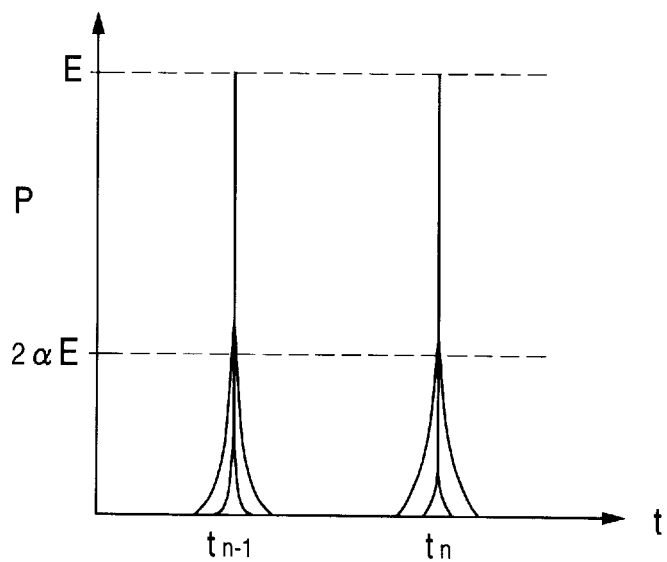
Figure 11:
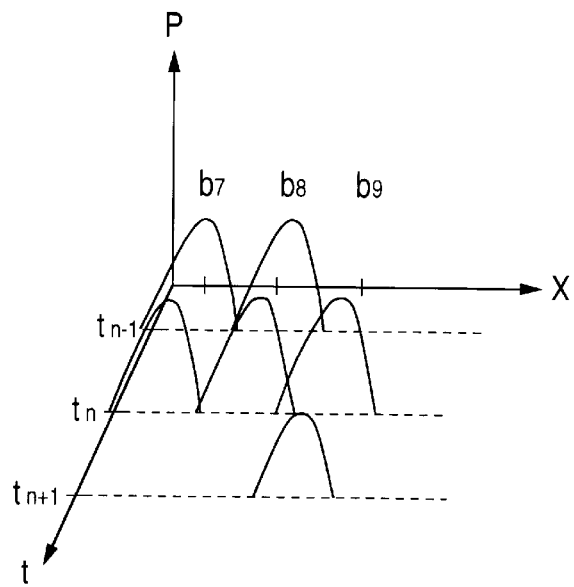
FIGS. 11(a) and 11(b) show exposure profiles at an end section of multiple-beam exposure pattern B of the present invention.
Figure 11:
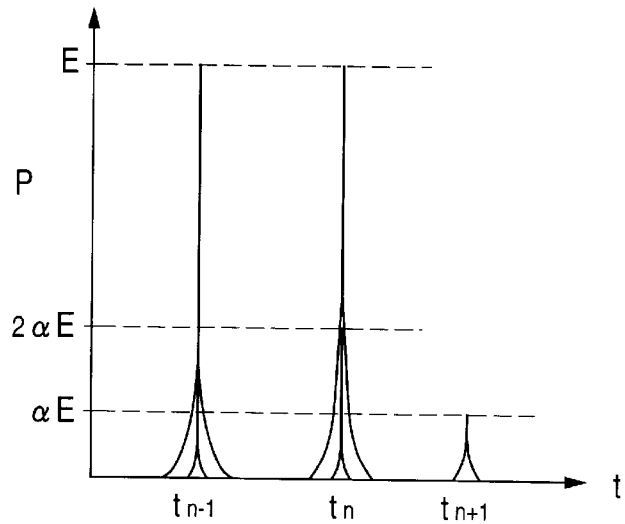

FIGS. 9 to 11 show multiple-beam exposure pattern B of the present invention. FIG. 9(a) corresponds to exposure points b1 (a left end section) and b2 in multiple-beam exposure pattern B of the present invention shown in FIG. 3—3, FIG. 10(a) corresponds to exposure points b2, b3 and b4 (all are in a middle section) therein, and FIG. 11(a) corresponds to exposure points b7, b8 (a right end section) and b9 (equivalent to b1, which is exposed by the light source positioned at the left end of the exposure head) therein. FIG. 9(b), FIG. 10(b) and FIG. 11(b) show exposure profiles with respect to the passage of time at exposure points b1 (equivalent to b9), b3 (equivalent each of to b2, b4, b7 and two exposure points between b4 and b7) and b8, respectively.

Figure 12:
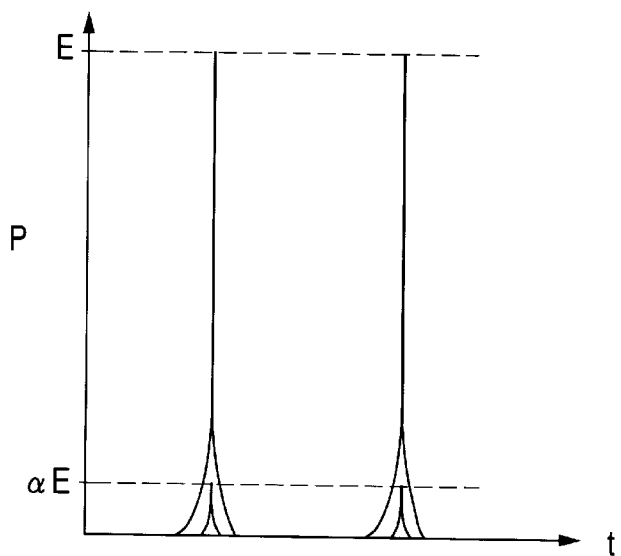
FIG. 12 shows the parts common to the exposure profiles shown in FIGS. 9(b) to 11(b)

FIG. 12 indicates common parts of the profiles of exposure amounts at certain exposure positions shown in FIGS. 9 to 11. That is, the profiles of exposure amounts at exposure point b1 (exposure point b1 is equivalent to b9, and has substantially the same profiles as those of b9) are exposure amount αE at time $t_{n-1}$, exposure amount E+2αE at time $t_n$ and exposure amount E+αE at time $t_{+1}$, as shown in FIG. 9(b), the profiles of exposure amounts at exposure point b3 are exposure amount E+2αE at time $t_{-1}$ and exposure amount E+2αE at time $t_n$, as shown in FIG. 10(b), and the profiles of exposure amounts at exposure point b8 are exposure amount E+αE at time $t_{n-1}$, exposure amount E+2αE at time $t_n$ and αE at time $t_{n+1}$, as shown in FIG. 11(b). Accordingly, the exposure amount of the common parts of the profiles of respective exposure amounts becomes (E+αE)+(E+αE)=(2E+2αE). If it is assumed that the order of exposure may be changed, the exposure amount of the common parts of the profiles of respective exposure amounts becomes (E+αE)+(E+αE)+αE=(2E+3αE).

Further, the total exposure amount (Et) at each of exposure points b1 (b9), b3 and b8 is 2E+4αE. The exposure amount of uncommon parts (Eu) of the profiles of exposure amounts is a difference between the total exposure amount Et=(2E+4αE) and the exposure amount of common parts Ec=(2E+2αE) or Ec=(2E+3αE), resulting in 2αE or αE. Furthermore, the ratio of the exposure amount of uncommon parts (Eu) to the total exposure amount (Et) becomes α/(1+2α) or α/(2+4α). The exposure multiplicity in the middle section Ic and that in the end sections Ie become 2 and 3, respectively. The exposure multiplicity in the common parts I becomes 2. In addition, the ratios of the exposure multiplicity in the middle section Ic and that in the end sections Ie to the exposure multiplicity of the common parts I becomes 1 and 1.5, respectively.

Figure 13:
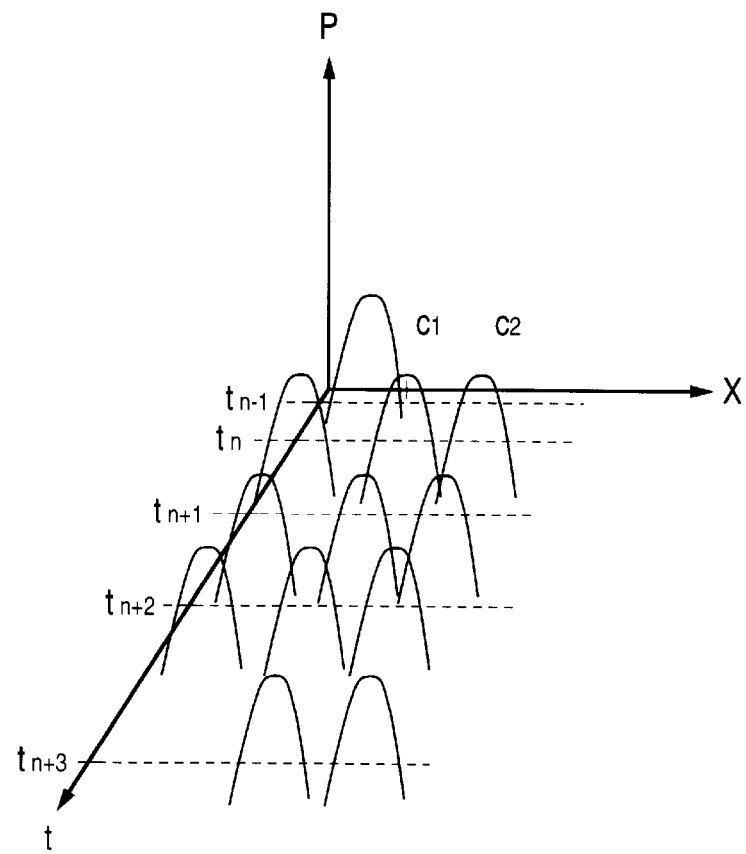
FIGS. 13(a) and 13(b) show exposure profiles at an end section of multiple-beam exposure pattern C of the present invention.
Figure 13:
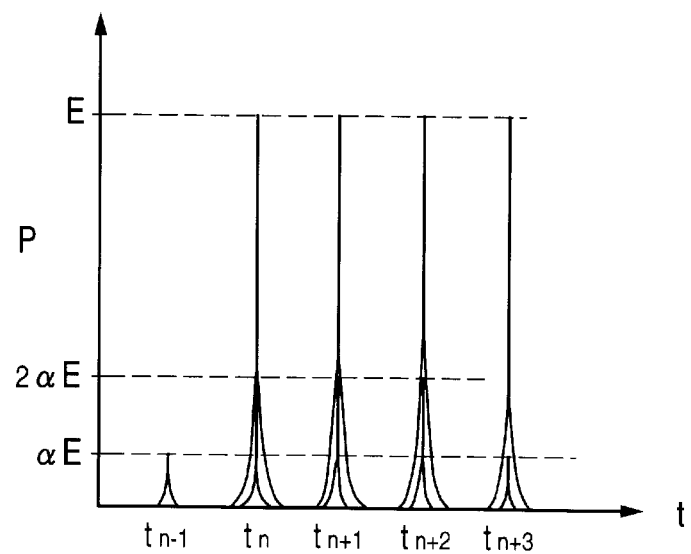
Figure 14:
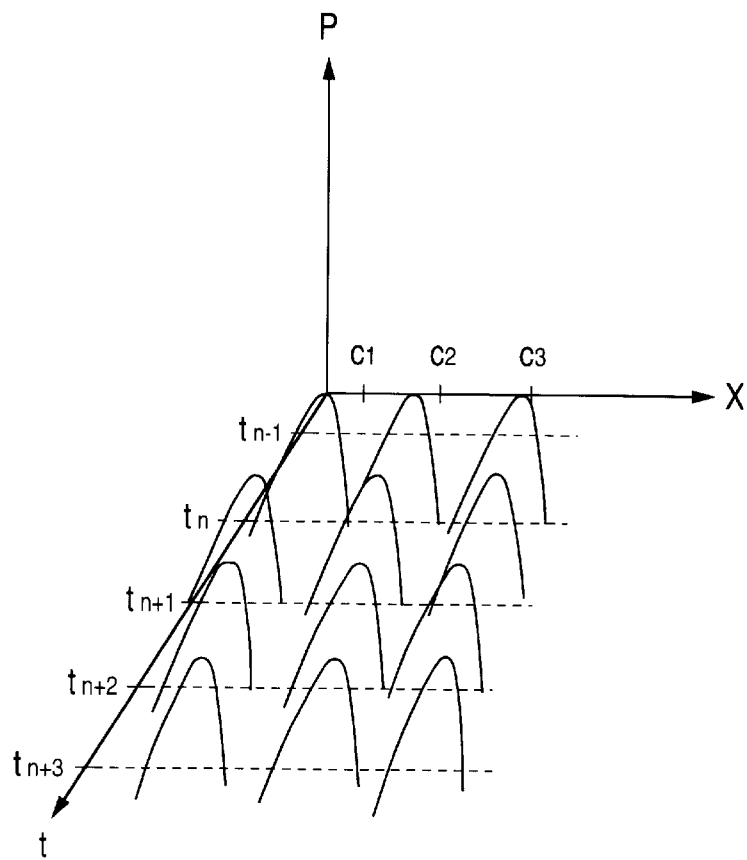
FIGS. 14(a) and 14(b) show exposure profiles at a middle section of multiple-beam exposure pattern C of the present invention.
Figure 14:
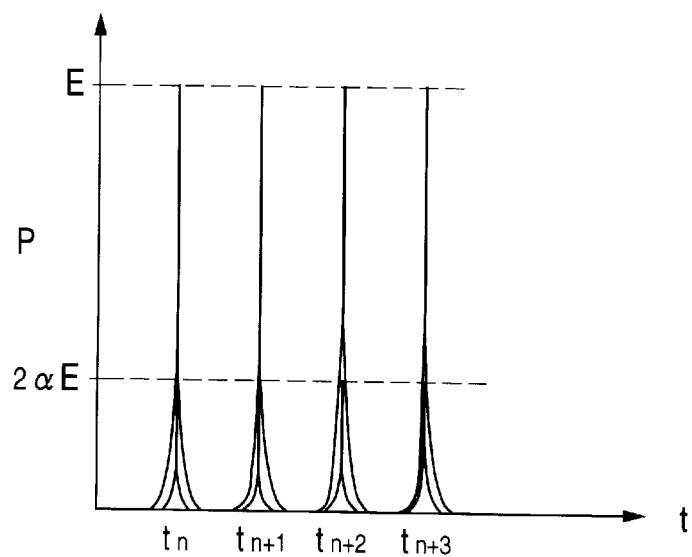
Figure 15:
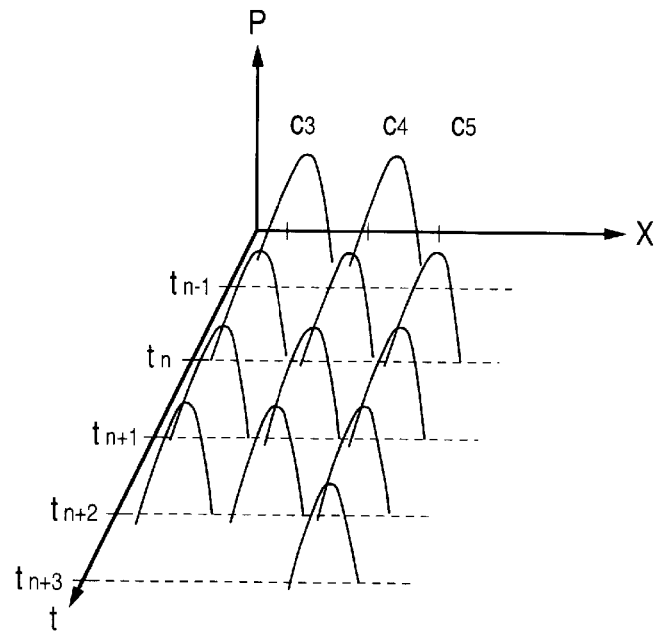
FIGS. 15(a) and 15(b) show exposure profiles at an end section of multiple-beam exposure pattern C of the present invention.
Figure 15:
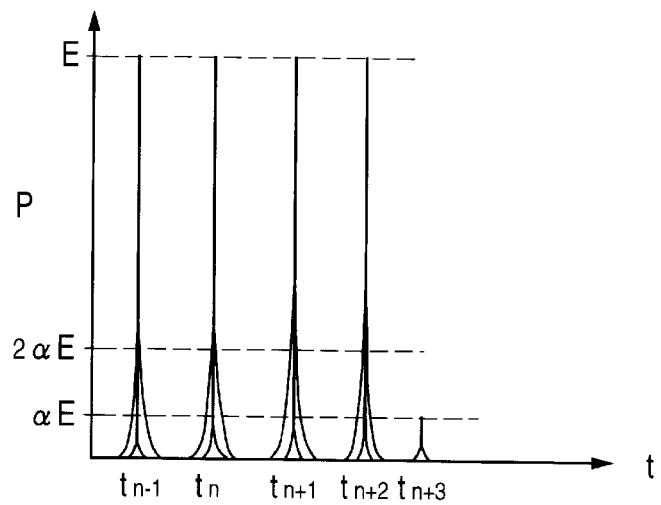

FIGS. 13 to 15 show multiple-beam exposure pattern C of the present invention. FIG. 13 correspond to exposure points c1 (a left end section) and c2 in multiple-beam exposure pattern C of the present invention shown in FIG. 3–4, FIG. 14 correspond to exposure points c1, c2 and c3 (a middle section) therein, and FIG. 15 correspond to exposure points c3, c4 (a right end section) and c5 (a left end section) therein. In each figure, (a) and (b) each shows profiles of exposure amounts in a similar manner to FIG. 4.

Figure 16:
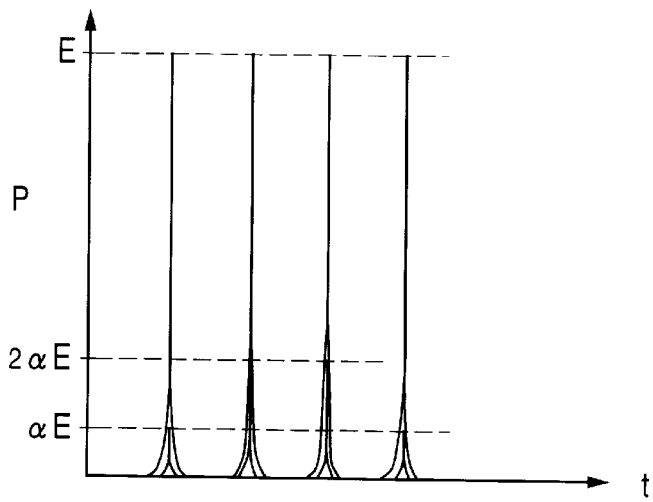
FIG. 16 shows the parts common to the exposure profiles shown in FIGS. 13(b) to 15(b).

FIG. 16 indicates common parts of the profiles of exposure amounts at certain exposure positions shown in FIGS. 13 to 15. That is, the profiles of exposure amounts at exposure point c1 are exposure amount αE at time $t_{n-1}$, exposure amount E+2αE at time $t_n$, exposure amount E+2αE at time $t_{n+1}$, exposure amount E+2αE at time $t_{n+2}$ and exposure amount E+αE at time $t_{n+3}$, as shown in FIG. 13(b), the profiles of exposure amounts at exposure point c2 are exposure amount E+2αE at time $t_n$, exposure amount E+2αE at time $t_{n+1}$, exposure amount E+2αE at time $t_{n+2}$ and exposure amount E+2αE at time $t_{n+3}$, as shown in FIG. 14(b), and the profiles of exposure amounts at exposure point c4 are exposure amount E+αE at time $t_{n-1}$, exposure amount E+2αE at time $t_n$, exposure amount E+2αE at time $t_{n+1}$, exposure amount E+2αE at time $t_{n+2}$ and αE at time $t_{n+3}$, as shown in FIG. 15 (b). Accordingly, the exposure amount of the common parts of the profiles of respective exposure amounts becomes (E+αE)+(E+2αE)+(E+2αE)+(E+αE)=(4E+6αE). If it is assumed that the order of exposure may be changed, the exposure amount of the common parts of the profiles of respective exposure amounts becomes (E+αE)+(E+2αE)+(E+2αE)+(E+αE)+αE =(4E+7αE).

Further, the total exposure amount (Et) at each of exposure points c1, c2 and c4 is 4E+8αE. The exposure amount of uncommon parts (Eu) of the profiles of exposure amounts is a difference between the total exposure amount Et=(4E+8αE) and the exposure amount of common parts Ec=(4E+6αE) or Ec=(4E+7αE), resulting in 2αE or αE. Furthermore, the ratio of the exposure amount of uncommon parts (Eu) to the total exposure amount (Et) becomes α/2 (1+2α) or α/(4+8α). The exposure multiplicity in the middle section Ic and that in the end sections Ie become 4 and 5, respectively. The exposure multiplicity in the common parts I becomes 4. In addition, the ratios of the exposure multiplicity in the middle section Ic and that in the end sections Ie to the exposure multiplicity of the common parts I becomes 1 and 1.25, respectively.

As shown in Table 1, multiple-beam exposure patterns B and C of the present invention are less than conventional multiple-beam exposure pattern A in the ratio of the exposure amount of uncommon parts (Eu) to the total exposure amount (Et) and in the difference between the exposure multiplicity in the middle section Ic and that in the end sections Ie to the exposure multiplicity of the common parts I. This shows that the difference in exposure conditions between both end sections and the middle section is small.

From the viewpoint of exposure streaks, smaller a is advantageous. In some cases, however, the absence of spaces between exposure points and the overlap of exposure to some extent are required for obtaining smooth image quality. The present invention is not limited by α. Further, it has not yet been sufficiently analyzed and under present circumstances whether the order of the common exposure parts may be changed or not. It is further expected that the decision may become different according to various factors such as the exposure conditions (such as the exposure illuminance, the multiplicity and the intermittent exposure intervals) and methods for preparing silver halide emulsions, particularly the kind of sensitizing dyes, the amount thereof used, how to allow them to be adsorbed, methods of chemical sensitization, halogen compositions, methods of doping with heavy metals such as iridium, iron, rhodium and ruthenium, and the kind of coordinate ions in doping.

A light-sensitive element having an image forming layer for use in the heat developable color light-sensitive material applicable to the image forming method of the present invention and a dye fixing element having a dye fixing layer are described in detail below.

The dye fixing element may be either separately provided on a support different from that for the light-sensitive element or provided on a support having thereon the light-sensitive element. For the mutual relations between the light-sensitive element and the dye fixing element, the relations to supports and the relations to white background reflection layers, the relations described in U.S. Pat. No. 4,500,626, column 57 can be applied.

In particular, it is preferred that the dye fixing layer is provided on a support different from that for the light-sensitive material. Further, it is preferred to give water to the light-sensitive element.

As mordants for use in the dye fixing layer, ones known in the field of photography can be used. Examples thereof include mordants described in U.S. Pat. No. 4,500,626, columns 58 and 59, JP-A-61-88256, pages 32 to 41, JP-A-62-244043 and JP-A-62-244036.

The light-sensitive elements fundamentally comprise a support having provided thereon a light-sensitive silver halide, a binder and a dye-donating compound (in some cases, a reducing agent serves therefor as described below), and can further contain an organic metal salt oxidizing agent as needed.

These components are added to the same layer in many cases, but can also be separately added to different layers as long as they are in the reactable state. For example, a reduction in sensitivity can be prevented by allowing a colored dye-donating compound to exist in a layer under the silver halide emulsion layer. The reducing agent is preferably contained in the light-sensitive element. However, it may be supplied from the outside, for example, by the method described below in which it is allowed to diffuse from the dye fixing element.

In order to obtain a wide range of colors in the chromaticity diagram by use of the three primary colors of yellow, magenta and cyan, at least three silver halide emulsion layers each having sensitivity in a different spectrum region are used in combination. For example, there are a combination of the three layers of a blue-sensitive layer, a green-sensitive layer and a red-sensitive layer, and a combination of a green-sensitive layer, a red-sensitive layer and an infrared-sensitive layer. The respective light-sensitive layers can be arranged in the various orders known in color photographic materials of the ordinary type. These light-sensitive layers may each be divided into two or more layers as needed.

The light-sensitive element can be provided with supplementary layers such as protective layers, undercoat layers, intermediate layers, yellow filter layers, antihalation layers and back layers.

The silver halide may be any of silver chloride, silver bromide, silver iodobromide, silver chlorobromide, silver chloroiodide and silver chloroiodobromide.

The silver halide emulsions may be either surface latent image type emulsions or internal latent image type emulsions. The internal latent image type emulsions are used as direct reversal emulsions in combination with nucleating agents or light fogging. Further, they may be so-called core/shell emulsions in which the insides of grains are different from the surfaces thereof in the phase. The silver halide emulsions may be either monodisperse emulsions or polydisperse emulsions, and monodisperse emulsions may be mixed. The grain size is preferably 0.1 to 2 μm, and more preferably 0.2 to 1.5 μm. The silver halide grains may be any of cubic, octahedral and tetradecahedral forms, a plate (tabular) form having a high aspect ratio, and others.

Specifically, any of silver halide emulsions can be used which are described in U.S. Pat. No. 4,500,626, column 50, U.S. Pat. No. 4,628,021, *Research Disclosure* (hereinafter abbreviated as "RD"), No. 17029 (1978) and JP-A-62-253159.

The silver halide emulsions can be used as such without post-ripening, but usually with chemical sensitization. Sulfur sensitization, reduction sensitization, noble metal sensitization and selenium sensitization usually known in emulsions for light-sensitive materials can be used alone or in combination. Such chemical sensitization can be conducted in the presence of nitrogen-containing heterocyclic compounds (JP-A-62-253159).

The amount of the light-sensitive silver halide emulsions coated is preferably 1 mg/m$^2$ to 10 g/m$^2$ in terms of silver.

Organic metal salts can also be used as oxidizing agents in combination with the light-sensitive silver halide emulsions. Of these organic metal salts, organic silver salts are particularly preferably used.

Organic compounds which can be used for formation of the above-described organic silver salt oxidizing agents included the benzotriazole compounds, fatty acids and other compounds described in U.S. Pat. No. 4,500,626, columns 52 and 53. Silver salts of carboxylic acids having alkynyl groups such as the silver phenylpropiolate described in JP-A-60-113235, and the silver acetylide described in JP-A-61-249044 are also useful. The organic silver salts may be used in combination.

The above organic silver salt can be used in combination in an amount of from 0.01 to 10 mol, preferably from 0.01 to 1 mol, per mol of light-sensitive silver halide. The total coating amount of the light-sensitive silver halide and the organic silver salt is suitably from 50 mg/m$^2$ to 10 g/m$^2$ in terms of silver.

Further, various antifoggants or photographic stabilizers can be used. Examples thereof include the azoles and azaindenes described in RD 17643, pages 24 and 25 (1978), the nitrogen-containing carboxylic acids and phosphoric acid compounds described in JP-A-59-168442, the mercapto compounds and metal salts thereof described in JP-A-59-111636, and the acetylene compounds described in JP-A-62-87957.

The silver halides may be spectrally sensitized with methine dyes or the like. The dyes used include cyanine dyes, merocyanine dyes, complex cyanine dyes, complex merocyanine dyes, holopolarcyanine dyes, hemicyanine dyes, styryl dyes and hemioxanol dyes.

Examples thereof include sensitizing dyes described in U.S. Pat. No. 4,617,257, JP-A-59-180550, JP-A-60-140335 and RD 17029, pages 12 and 13 (1978).

These sensitizing dyes may be used alone or in combination. The combinations of the sensitizing dyes are often used, particularly for supersensitization.

The emulsions may contain dyes having no spectral sensitization function themselves or compounds which do not substantially absorb visible light, but exhibit supersensitization, in combination with the sensitizing dyes (for example, ones described in U.S. Pat. No. 3,615,641 and JP-A-63-23145).

The sensitizing dyes may be added either during chemical ripening, or before or after chemical sensitization, or may be added before or after nucleation of silver halide grains according to U.S. Pat. Nos. 4,183,756 and 4,225,666. The amount thereof added is generally about 10$^{-8}$ to 10$^{-2}$ mol per mol of silver halide.

As the binders for the layers constituting the light-sensitive element and the dye fixing element, hydrophilic binders are preferably used. Examples thereof include binders described in JP-A-62-253159, pages 26 to 28. Specifically, transparent or translucent hydrophilic binders are preferred, and examples thereof include natural compounds such as proteins (for example, gelatin and gelatin derivatives) and polysaccharides (for example, cellulose derivatives, starch, gum arabic, dextran and pullulan); and synthetic polymers such as polyvinyl alcohol, polyvinylpyrrolidone and polyacrylamide. Further, high water-absorptive polymers described in JP-A-62-245260, namely homopolymers of vinyl monomers having —COOM or —SO$_3$M (wherein M represents a hydrogen atom or an alkali metal), or copolymers of these vinyl monomers with each other or with other monomers (for example, sodium methacrylate, ammonium methacrylate and Sumikagel L-5H manufactured by Sumitomo Chemical Co, Ltd.) can also be used. These binders can also be used in combination.

When the system of supplying a trace amount of water to conduct heat development is employed, use of the above-described high water-absorptive polymers makes it possible to rapidly absorb water. Further, use of the high water-absorptive polymers in the dye fixing layer or the protective layer thereof permits prevention of retransfer of the dyes from the dye fixing element to others after transfer.

The amount of the binder coated is preferably 20 g/m$^2$ or less, more preferably 10 g/m$^2$ or less, and most preferably 7 g/m$^2$ or less.

The layers (including the back layers) constituting the light-sensitive element or the dye fixing element can contain various polymer latices for improvements in film characteristics such as dimensional stabilization, curl prevention, adhesion prevention, prevention of crack development in films and prevention of pressure sensitization and desensitization. Specifically, any of the polymer latices described in JP-A-62-245258, JP-A-62-136648 and JP-A-62-110066 can be used. In particular, use of a polymer latex having a low glass transition temperature (40° C. or less) in a mordant layer permits prevention of crack development in the mordant layer, and use of a polymer latex having a high glass transition temperature in the back layer provides a curl prevention effect.

As the reducing agents, those known in the field of light-sensitive element can be used. Further, the reducing agent also includes reductive dye-donating compounds described below (in this case, they can be used in combination with other reducing agents). Furthermore, precursors of reducing agents can also be used which themselves have no reductive ability, but exhibit reductive ability by action of nucleophilic reagents or heat during the course of development.

Examples of the reducing agent include the reducing agents and precursors of reducing agents described in U.S. Pat. Nos. 4,500,626, columns 49 and 50, 4,483,914, columns 30 and 31, 4,330,617 and 4,590,152, JP-A-60-140335, pages 17 and 18, JP-A-57-40245, JP-A-56-138736, JP-A-59-178458, JP-A-59-53831, JP-A-59-182449, JP-A-59-182450, JP-A-60-119555, JP-A-60-128436 to JP-A-60-128439, JP-A-60-198540, JP-A-60-181742, JP-A-61-259253, JP-A-62-244044, JP-A-62-131253 to JP-A-62-131256, and EP-A-220,746, pages 78 to 96.

Combinations of various reducing agents can also be used as disclosed in U.S. Pat. No. 3,039,869.

When nondiffusion reducing agents are used, electron transfer agents and/or precursors thereof can be used in combination to enhance electron transfer between the nondiffusion reducing agents and the silver halides as needed.

The electron transfer agents or the precursors thereof can be selected from the reducing agents or the precursors thereof described above. It is desirable that the electron transfer agents or the precursors thereof are higher in their mobility than the nondiffusion reducing agents (electron donors). Particularly useful electron transfer agents are 1-phenyl-3-pyrazolidone derivatives and aminophenol derivatives.

The nondiffusion reducing agents (electron donors) used in combination with the electron transfer agents may be any of the above-described reducing agents, as long as they do not substantially move in the layers of the light-sensitive material. Preferred examples thereof include hydroquinone derivatives, sulfonamidophenols, sulfonamidonaphthols and compounds described in JP-A-53-110827 as electron donors, and nondiffusion, reductive dye-donating compounds described below.

The amount of the reducing agent added is generally from 0:001 to 20 mol, and particularly preferably from 0.01 to 10 mol, per mol of silver.

Silver can be used as an image forming substance. It can also contain a compound which produces or releases a mobile dye, when silver ions are reduced to silver in a high-temperature state, corresponding to or reversely corresponding to this reaction, namely a dye-donating compound.

Examples of the dye-donating compound include compounds forming dyes by the oxidation coupling reaction (couplers). The couplers may be either 4-equivalent couplers or 2-equivalent couplers. Further, 2-equivalent couplers having nondiffusion groups as releasing groups and forming diffusive dyes by the oxidation coupling reaction are also preferred. The nondiffusion groups may be polymer chains. Examples of color developing agents and the couplers are described in T. H. James, *The theory of the Photographic Process*, the fourth edition, pages 291 to 334 and 354 to 361, JP-A-58-123533, JP-A-58-149046, JP-A-58-149047, JP-A-59-111148, JP-A-59-124399, JP-A-59-174835, JP-A-59-231539, JP-A-59-231540, JP-A-60-2950, JP-A-60-2951, JP-A-60-14242, JP-A-60-23474 and JP-A-60-66249 in detail.

Further, examples of the dye-donating compound include compounds having the function of releasing or diffusing diffusive dyes imagewise. The compounds of this type can be represented by the following general formula [LI]:

$$(Dye-Y)_n\text{-}Z \qquad [LI]$$

wherein Dye represents a dye group, a dye group temporarily shifted to a short wavelength, or a dye precursor group; Y represents only a bond or a bonding group; Z represents a group having the property of bringing about the difference in diffusibility of the compound represented by $(Dye-Y)_n\text{-}Z$ corresponding to or reversely corresponding to a light-sensitive silver salt having a latent image imagewise, or releasing Dye to produce the difference in diffusibility between Dye released and $(Dye-Y)_n\text{-}Z$; n represents 1 or 2; and when n is 2, two (Dye-Y)'s may be the same or different.

Specific examples of the dye-donating compounds represented by general formula [LI] include the following compounds (1) to (5). The following compounds (1) to (3) form diffusive dye images (positive dye images) reversely corresponding to the development of silver halides, and the following compounds (4) and (5) form diffusive dye images (negative dye images) corresponding to the development of silver halides.

(1) The dye developing agents described in U.S. Pat. Nos. 3,134,764, 3,362,819, 3,597,200, 3,544,545 and 3,482,972 in which hydroquinone developing agents and dye components are connected to each other. These dye developing agents are diffusible under alkaline conditions, but react with silver halides to become nondiffusible.

(2) As described in U.S. Pat. No. 4,503,137, nondiffusible compounds can also be used which release diffusible dyes under alkaline conditions, but react with silver halides to lose their ability. Examples thereof include compounds releasing diffusible dyes by the intermolecular nucleophilic substitution reaction described in U.S. Pat. No. 3,980,479, and compounds releasing diffusible dyes by the intermolecular rearrangement reaction of isooxazolone rings described in U.S. Pat. No. 4,199,354.

(3) As described in U.S. Pat. No. 4,559,290, EP-A-220746 (A2), U.S. Pat. No. 4,783,396 and JIII Journal of Technical Disclosure No. 87-6199, nondiffusible compounds can also be used which react with reducing agents left unoxidized upon development to release diffusible dyes.

Examples thereof include the compounds which release diffusible dyes by the intermolecular nucleophilic substitution reaction after reduction as described in U.S. Pat. Nos. 4,139,389 and 4,139,379, JP-A-59-185333 and JP-A-57-84453, the compounds which release diffusible dyes by the intermolecular electron migration reaction after reduction as described in U.S. Pat. No. 4,232,107, JP-A-59-101649, JP-A-61-88257and RD 24025 (1984), the compounds which release diffusible dyes by cleavage of single bonds after reduction as described in West German Patent 3,008,588A, JP-A-56-142530, U.S. Pat. Nos. 4,343,893 and 4,619,884, the nitro compounds which release diffusible dyes after electron acceptance as described in U.S. Pat. No. 4,450,223, and the compounds release diffusible dyes after electron acceptance as described in U.S. Pat. No. 4,609,610.

More preferred examples thereof include the compounds each having an N—X bond (wherein X represents an oxygen atom, a sulfur atom or a nitrogen atom) and an electron attractive group in one molecule as described in EP-A-220746, JIII Journal of Technical Disclosure No. 87-6199, U.S. Pat. No. 4,783,396, JP-A-63-201653 and JP-A-63-201654, the compounds each having an $SO_2$—X (wherein X has the same meaning as given above) and an electron attractive group in one molecule as described in JP-A-1-26842, the compounds each having a PO—X bond (wherein X has the same meaning as given above) and an electron attractive group in one molecule as described in JP-A-63-271344, and the compounds each having a C—X' bond (wherein X' has the same meaning as X, or represents —$SO_2$—) and an electron attractive group in one molecule as described in JP-A-63-271341. Further, the compounds described in JP-A-1-161237 and JP-A-1-161342 can also be utilized in which single bonds are cleaved after reduction by π bonds conjugated with electron accepting groups to release diffusive dyes.

Of these, the compounds each having an N—X bond and an electron attractive group in one molecule are particularly preferred. Specific examples thereof include compounds (1) to (3), (7) to (10), (12), (13), (15), (23) to (26), (31), (32), (35), (36), (40), (41), (44), (53) to (59), (64) and (70) described in EP-A-220746 or U.S. Pat. No. 4,783,396, and compounds (11) to (23) described in JIII Journal of Technical Disclosure No. 87-6199.

(4) Compounds (DDR couplers) which are couplers having diffusive dyes in releasing groups and release the diffusive dyes by the reaction of reducing agents with oxides. Specific examples thereof include compounds described in British Patent 1,330,524, JP-B-48-39165 (the term "JP-B" as used herein means an "examined Japanese patent publication"), U.S. Pat. Nos. 3,443,940, 4,474,867 and 4,483, 914.

(5) Compounds (DRR compounds) which are reductive to silver halides or organic silver salts and reduce them to release diffusive dyes. These compounds do not necessitate use of other reducing agents. There is therefore preferably no problem of image stains caused by oxidized degradation products of reducing agents. Typical examples thereof are described in U.S. Pat. Nos. 3,928,312, 4,053,312, 4,055,428 and 4,336,322, JP-A-59-65839, JP-A-59-69839, JP-A-53-3819, JP-A-51-104343, RD 17465, U.S. Pat. Nos. 3,725,062, 3,728,113 and 3,443,939, JP-A-58-116537, JP-A-57-179840 and U.S. Pat. No. 4,500,626. Specific examples of the DRR compounds include the compounds described in U.S. Pat. No. 4,500,626, columns 22 to 44, described above. Compounds (1) to (3), (10) to (13), (16) to (19), (28) to (30), (33) to (35), (38) to (40) and (42) to (64) described in the above-described U.S. Patent are preferred among others. Further, compounds described in U.S. Pat. No. 4,639,408, columns 37 to 39 are also useful.

In addition, as dye-donating compounds other than the above-described couplers and compounds represented by general formula [LI], it is also possible to use dye silver compounds in which organic silver salts and dyes are connected to each other (RD, May 1978, pages 54 to 58), azo dyes used in the heat developable silver dye bleaching method (U.S. Pat. No. 4,235,957 and RD, April 1976, pages 30 to 32) and leuco dyes (U.S. Pat. Nos. 3,985,565 and 4,022,617).

The hydrophobic additives such as the dye-donating compounds and the nondiffusion reducing agents can be introduced into the layers of the light-sensitive element by known methods such as the method described in U.S. Pat. No. 2,322,027. In this case, high boiling organic solvents as described in JP-A-59-83154, JP-A-59-178451, JP-A-59-178452, JP-A-59-178453, JP-A-59-178454, JP-A-59-178455 and JP-A-59-178457 can be used in combination with low boiling organic solvents having a boiling point of 50° to 160° C. as needed.

The amount of the high boiling organic solvents is generally 10 g or less, and preferably 5 g or less, per gram of the dye donating compound to be used. Further, it is 1 cc or less, preferably 0.5 cc or less, and more preferably 0.3 cc or less, per gram of binder.

The dispersing methods according to polymerized products described in JP-B-51-39853 and JP-A-51-59943 can also be used.

The compounds substantially insoluble in water can be dispersed in binders as fine grains to add them to the layers, in addition to the above-described methods.

When the hydrophobic compounds are dispersed in hydrophilic colloids, various surfactants can be used. For example, the surfactants described in JP-A-59-157636, pages 37 and 38 can be used.

Further, compounds for activating development and stabilizing images can be used in the light-sensitive element. Preferred examples of such compounds are described in U.S. Pat. No. 4,500,626, columns 51 and 52.

In the layers constituting the light-sensitive element and the dye fixing element, high boiling organic solvents can be used as plasticizers, slipping agents or separation improvers of the light-sensitive element from the dye fixing element. Examples thereof include solvents described in JP-A-62-253159, page 25 and JP-A-62-245253.

Further, various silicone oils (all silicone oils including dimethylsilicone oils and modified silicone oils in which various organic groups are introduced into dimethylsiloxanes) can be used as the above-described agents. Effective examples thereof include various modified silicone oils described in *Modified Silicone Oils,* Technical Data P6-18B, published by Shinetsu Silicone Co., Ltd., particularly carboxy-modified silicone (trade name: X-22-3710).

Furthermore, the silicone oils described in JP-A-62-215953 and JP-A-63-46449 are also effective.

Antifading agents may be used in the light-sensitive element and the dye fixing element. Examples of the antifading agents include antioxidizing agents, ultraviolet absorbers and certain metal complexes.

The antioxidizing agents include, for example, chroman compounds, coumaran compounds, phenol compounds (for example, hindered phenols), hydroquinone derivatives, hindered amine derivatives and spiroindan compounds. The compounds described in JP-A-61-159644 are also effective.

The ultraviolet absorbers include benzotriazole compounds (U.S. Pat. No. 3,533,794), 4-thiazolidone compounds (U.S. Pat. No. 3,352,681), benzophenone compounds (JP-A-46-2784), and the compounds described in JP-A-54-48535, JP-A-62-136641 and JP-A-61-88256. Further, the ultraviolet absorptive polymers described in JP-A-62-260152 are also effective.

The metal complexes include the compounds described in U.S. Pat. Nos. 4,241,155, 4,245,018, columns 3 to 36, and 4,254,195, columns 3 to 8, JP-A-62-174741, JP-A-61-88256, pages 27 to 29, JP-A-63-199248, JP-A-1-75568 and JP-A-1-74272.

Examples of the useful antifading agents are described in JP-A-62-215272, pages 125 to 137.

The antifading agent for preventing fading of a dye transferred to the dye fixing element may previously be added to the dye fixing element, or may be supplied from the outside such as the light-sensitive element.

The above-described antioxidizing agents, ultraviolet absorbers and metal complexes may be used in combination.

Fluorescent brighteners may be used in the light-sensitive element and the dye fixing element. In particular, it is preferred that the fluorescent brightener is contained in the dye fixing element or supplied from the outside such as the light-sensitive element. Examples thereof include the compounds described in *The Chemistry of Synthetic Dyes,* edited by K. Veenkataraman, vol. V, chapter 8 and JP-A-61-143752. More specifically, they include stilbene compounds, coumarin compounds, biphenyl compounds, benzoxazolyl compounds, naphthalimide compounds, pyrazoline compounds and carbostylyl compounds.

The fluorescent brighteners can be used in combination with the antifading agents.

Hardeners used in the layers constituting the light-sensitive element and the dye fixing element include the hardeneds described in U.S. Pat. No. 4,678,739, column 41, JP-A-59-116655, JP-A-62-245261 and JP-A-61-18942. More specifically, examples thereof include aldehyde hardeners (such as formaldehyde), aziridine hardeners, epoxy hardeners, vinylsulfone hardeners (such as N,N'-ethylenebis (vinyl-sulfonylacetamido)ethane), N-methylol hardeners (dimethylolurea) and polymer hardeners (compounds described in JP-A-62-234157).

In the layers constituting the light-sensitive elements and the dye fixing elements, various surfactants can be used for assisting coating, improving separation, improving slipperiness, preventing electric charge and accelerating development. Examples of the surfactants are described in JP-A-62-173463 and JP-A-62-183457.

The layers constituting the light-sensitive element and the dye fixing element may contain organic fluoro compounds for improving slipperiness, preventing electric charge and improving separation. Typical examples of the organic fluoro compounds include the fluorine surfactants described in JP-B-57-9053, columns 8 to 17, JP-A-61-20944 and JP-A-62-135826, and hydrophobic fluorine compounds such as oily fluorine compounds (for example, fluorine oils) and solid fluorine compounds (for example, ethylene tetrafluoride resins).

In the light-sensitive element and the dye fixing element, matte agents can be used. The matte agents include the compounds described in JP-A-63-274944 and JP-A-63-274952 such as benzoguanamine resin beads, polycarbonate resin beads and AS resin beads, as well as compounds such as silicon dioxide, polyolefins and polymethacrylates described in JP-A-61-88256, page 29.

Besides, the layers constituting the light-sensitive element and the dye fixing element may contain heat solvents, antifoaming agents, microbicidal antifungal agents and colloidal silica. Examples of these additives are described in JP-A-61-88256, pages 26 to 32.

Image formation accelerating agents can be used in the light-sensitive element and/or the dye fixing element. The image formation accelerating agents have functions such as the acceleration of the redox reaction of the silver salt oxidizing agents and the reducing agents, the acceleration of a reaction such as the formation of dyes from the dye-donating substances, the degradation of dyes or the release of the diffusive dyes and the acceleration of the movement of dyes from the light-sensitive element to the dye fixing element, and can be classified into bases or base precursors, nucleophilic compounds, high boiling organic solvents (oils), heat solvents, surfactants, compounds having interaction with silver or silver ions, according to the physico-chemical functions. However, these groups of substances generally have combined functions, and therefore, they have usually combinations of some of the above-described acceleration effects The details thereof are described in U.S. Pat. No. 4,678,739, columns 38 to 40.

The base precursors include salts of organic acids and bases which are decarboxylated by heat, and compounds releasing amines by the intermolecular nucleophilic substitution reaction, the Lossen rearrangement or the Beckmann rearrangement. Specific examples thereof are described in U.S. Pat. No. 4,511,493 and JP-A-62-65038.

In a system in which heat development and dye transfer are performed at the same time in the presence of a small amount of water, it is preferred from the view point of the enhancement of keeping quality of the light-sensitive elements that the bases and/or the base precursors are allowed to be contained in the dye fixing elements.

In addition to the above, the combinations of slightly soluble metal compounds and compounds (referred to as complex-formable compounds) which can form complexes with metal ions constituting said slightly soluble metal compounds as described in EP-A-210660 and U.S. Pat. No. 4,740,445, and the compounds generating bases by electrolysis as described in JP-A-61-232451 can also be used as the base precursors. In particular, the former is effective. It is advantageous that the slightly soluble metal compounds and the complex-formable compounds are separately added to the light-sensitive element and the dye fixing element.

In the light-sensitive element and/or the dye fixing element, various development stoppers can be used for obtaining stably constant images against fluctuations in processing temperature and processing time on development.

The development stopper as used herein is a compound which, after normal development, rapidly neutralizes or reacts with a base to reduce the concentration of the base contained in a film, thereby stopping development, or a compound which interacts with silver and a silver salt to inhibit development. Examples thereof include acid precursors which release acids by heating, electrophilic compounds which conduct the replacement reaction with coexisting bases by heating, nitrogen-containing heterocyclic compounds, mercapto compounds and precursors thereof. More specifically, they are described in JP-A-62-253159, pages 31 and 32.

The heat developable light-sensitive material comprises the light-sensitive element and the dye fixing element. In many of conventional heat developable light-sensitive materials, the used light-sensitive elements after processing become wastes, and the dye fixing elements form the intended images. In some cases, however, an image forming system is also devised in which the light-sensitive elements form the intended images, and the dye fixing elements become wastes. The supports are used as supports for the elements which become waste.

The supports used for the elements which form the intended images are described below. Accordingly, the followings are not applied to the supports used for the elements which become wastes after processing.

In the present invention, supports which can endure processing temperatures are used as the supports employed in the light-sensitive element and the dye fixing element. In general, the supports include paper and synthetic polymers (films). Specifically, the supports used include polyethylene terephthalate, polycarbonates, polyvinyl chloride, polystyrene, polypropylene, polyimides, cellulose derivatives (for example, cellulose triacetate), films thereof containing pigments such as titanium oxide, synthetic paper produced from propylene by film methods, mixed paper produced from pulp of synthetic resins such as polyethylene and natural pulp, Yankee paper, baryta paper, coated paper (particularly, cast-coated paper), metals, cloth and glass.

They can be used alone or as supports coated with synthetic polymers such as polyethylene on one side or both sides.

In addition, supports described in JP-A-62-253159, pages 29 to 31 can be used.

The surfaces of these supports may be coated with hydrophilic binders and semiconductive metal oxides such as alumina sols and tin oxide, or with antistatic agents such as carbon-black.

Light sources such as natural light, tungsten lamps, light emitting diodes, laser sources and CRT light sources described in U.S. Pat. No. 4,500,626, column 56, can be used to record images on the light-sensitive element.

Further, images can also be exposed using wavelength converting elements in which non-linear optical materials are combined with coherent light sources such as laser beams. Here, the non-linear optical material is a material which can exhibit non-linearity between an electrical field and polarization appearing when a strong optical electrical field such as a laser beam is given. Examples of such materials preferably used include inorganic compounds represented by lithium niobate, potassium dihydrogenphosphate (KDP), lithium iodate and $BaB_2O_4$, urea derivatives, nitroaniline derivatives, nitropyridine-N-oxide derivatives such as 3-methyl-4-nitropyridine-N-oxide (POM), and the compounds described in JP-A-61-53462 and JP-A-62-210432. As the forms of the wavelength converting elements, the single crystal optical waveguide path type and the fiber type are known, and both are useful.

Furthermore, image signals obtained from video cameras or electronic still cameras, television signals represented by the Nippon Television Signal Criteria (NTSC), image signals obtained by dividing original pictures into many picture elements with scanners and image signals produced by use of computers represented by CGs and CADs can be utilized as image information.

The light-sensitive element and/or the dye fixing element may have conductive heating layers as heating means for heat development or diffusion transfer of dyes. In this case, transparent or opaque heating elements described in JP-A-

61-145544 can be utilized. These conductive layers also function as antistatic layers.

Although heat development can be achieved at a heating temperature of about 50° C. to about 250° C., it is particularly useful to conduct heat development at a heating temperature of about 80° C. to about 180° C. Diffusion transfer of dyes may be carried out either concurrently with heat development or after termination of heat development. In the case of the latter, the transfer can be achieved at a heating temperature ranging from room temperature to the temperature in the heat development stage, more preferably at a temperature ranging from 50° C. to a temperature about 10° C. lower than the temperature in the heat development stage.

The movement of dyes takes place only by heat. However, solvents may be used for accelerating the movement of dyes. As described in detail in JP-A-59-218443 and JP-A-61-238056, it is also useful to carry out heating in the presence of a small amount of solvent (particularly, water) to conduct development and transfer at the same time or continuously. In this system, the heating temperature is preferably 50° C. to the boiling point of the solvent. For example, when the solvent is water, the heating temperature is desirably 50° C. to 100° C.

Examples of the solvents for accelerating development and/or moving the diffusive dyes to the dye fixing layers include water and basic aqueous solutions containing inorganic alkali metal salts or organic bases (the bases described for the image formation accelerating agents are used as these bases). Further, low boiling solvents or mixed solutions of low boiling solvents and water or basic aqueous solutions can also be used. Furthermore, surfactants, antifoggants, slightly soluble metal salts and complex-formable compounds may be contained in the solvents.

These solvents can be given to either or both of the light-sensitive element and the dye fixing element. The amount thereof used is as little as the weight of solvent corresponding to the maximum swelled volume of the whole coated films or less (particularly, the amount obtained by the subtraction of the weight of the whole coated films from the weight of solvent corresponding to the maximum swelled volume of the whole coated films, or less).

Examples of methods for giving the solvents to the light-sensitive layer or the dye fixing layer include the methods described in JP-A-61-147244, page 26. Further, solvents enclosed in microcapsules can also be previously contained in either or both of the light-sensitive element and the dye fixing element.

In order to accelerate the movement of dyes, hydrophilic heat solvents which are solid at ordinary temperature and soluble at high temperatures can be contained in the light-sensitive element or the dye fixing element. The hydrophilic heat solvents may be contained in either of the light-sensitive element and the dye fixing element, and in any of the emulsion layers, the intermediate layers, the protective layers and the dye fixing layers. However, it is preferred to be contained in the dye fixing layer and/or their adjacent layers.

Examples of the hydrophilic heat solvents include urea derivatives, pyridine derivatives, amides, sulfonamides, imides, alcohols, oximes and other heterocyclic compounds.

Further, in order to accelerate the movement of dyes, high boiling organic solvents may be contained in the light-sensitive element and/or the dye fixing element.

Heating methods in the development and/or transfer stage include methods of bringing the light-sensitive element and the dye fixing element into contact with heated blocks, heated plates, hot pressers, heat rolls, heat drums, halogen lamp heaters, infrared or far infrared lamp heaters, and methods of passing them through atmospheres of high temperatures.

For the pressure conditions and methods for applying pressure at the time when the light-sensitive element and the dye fixing element are placed one over the other, the methods described in JP-A-61-147244, page 27 can be applied.

Any of various heat development devices can be used for processing the photographic elements. For example, the devices described in JP-A-59-75247, JP-A-59-177547, JP-A-59-181353, JP-A-60-18951 and JP-A-U-62-25994 (the term "JP-A-U" as used herein means an "unexamined published Japanese utility model application") are preferably used.

As commercially available devices, Pictrostat 200 and Pictrography 3000 manufactured by Fuji Photo Film Co., Ltd. are preferably used.

The present invention will be described in more detail with reference to the following Examples for light-sensitive materials applicable to the image forming methods of this invention, but the invention should not be construed as being limited thereto.

EXAMPLE 1

Methods for preparing light-sensitive silver halide emulsions are described.

Light-Sensitive Silver Halide Emulsion (1) (Emulsion for Fifth Layer)

Solution (I) and solution (II) having the compositions shown in Table 3 were concurrently added to an aqueous solution having the composition shown in Table 2 over a period of 13 minutes with sufficient stirring. Ten minutes after that, solution (III) and solution (IV) having the compositions shown in Table 3 were added over a period of 33 minutes.

TABLE 2

| Composition | |
|---|---|
| $H_2O$ | 620 cc |
| Lime-Treated Gelatin | 20 g |
| KBr | 0.3 g |
| NaCl | 2 g |
| Solvent for Silver Halide (1) | 0.030 g |
| Sulfuric Acid (1 N) | 16 cc |
| Temperature | 45° C. |

TABLE 3

| | Solution I | Solution II | Solution III | Solution IV |
|---|---|---|---|---|
| $AgNO_3$ | 30.0 g | — | 70.0 g | — |
| KBr | — | 13.7 g | — | 44.2 g |
| NaCl | — | 3.62 g | — | 2.4 g |
| $K_2IrCl_6$ | — | — | — | 0.039 mg |
| Total Amount | Water to make 126 ml | Water to make 132 ml | Water to make 254 ml | Water to make 252 ml |

Solvent for Silver Halide (1)

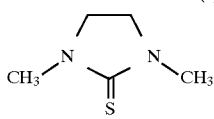

A 0.35% aqueous solution of sensitizing dye (1) (150 cc) was added thereto over a period of 27 minutes starting from 13 minutes after the start of addition of solution (III).

Sensitizing Dye (1)

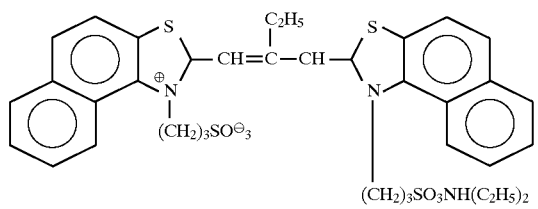

After conventional washing and salt removal (conducted at pH 4.1 using precipitant (a)), 22 g of lime-treated gelatin was added. After adjustment to pH 6.0 and pAg 7.9, chemical sensitization was conducted at 60° C. Compounds used in the chemical sensitization are as shown in Table 4. Thus, a monodisperse cubic silver chlorobromide emulsion having a coefficient of variation of 10.2% and a mean grain size of 0.20 μm was obtained. The yield of this emulsion was 630 g.

Precipitant (a)

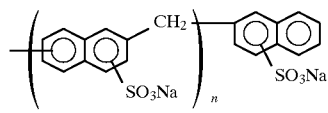

Precipitant (b)

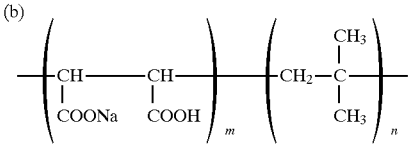

TABLE 4

| Agent Used in Chemical Sensitization | Amount Added |
|---|---|
| 4-Hydroxy-6-methyl-1,3,3a,7-tetraazaindene | 0.36 g |
| Sodium Thiosulfate | 6.75 mg |
| Antifoggant (1) | 0.11 g |
| Preservative (1) | 0.07 g |
| Preservative (2) | 3.13 g |

Antifoggant (1)

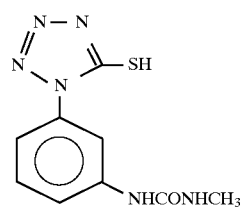

Preservative (1)

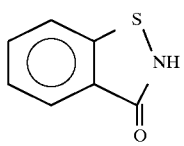

Preservative (2)

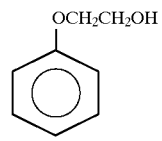

Preservative (3)

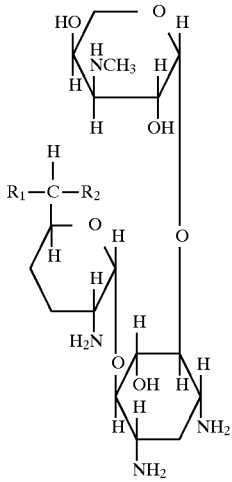

| | $R_1$ | $R_2$ |
|---|---|---|
| | $H_3C-$ | $-NHCH_3$ |
| A mixture of | $H_3C-$ | $-NH_2$ |
| | $H-$ | $-NH_2$ |
| | $H-$ | $-NHCH_3$ |

Light-Sensitive Silver Halide Emulsion (2) (Emulsion for Third Layer)

Solution (I) and solution (II) having the compositions shown in Table 6 were concurrently added to an aqueous solution having the composition shown in Table 5 over a period of 18 minutes with sufficient stirring. Ten minutes after that, solution (III) and solution (IV) having the compositions shown in Table 6 were added over a period of 24 minutes.

TABLE 5

| Composition | |
|---|---|
| $H_2O$ | 620 cc |
| Lime-Treated Gelatin | 20 g |
| KBr | 0.3 g |
| NaCl | 2 g |
| Solvent for Silver Halide (1) | 0.030 g |
| Sulfuric Acid (1 N) | 16 cc |
| Temperature | 45° C. |

TABLE 6

| | Solution I | Solution II | Solution III | Solution IV |
|---|---|---|---|---|
| $AgNO_3$ | 30.0 g | — | 70.0 g | — |
| KBr | — | 13.7 g | — | 44.2 g |
| NaCl | — | 3.62 g | — | 2.4 g |
| $K_4[Fe(CN)_6] \cdot H_2O$ | — | — | — | 0.07 mg |
| Total Amount | Water to make 188 ml | Water to make 188 ml | Water to make 250 ml | Water to make 250 ml |

After conventional washing and salt removal (conducted at pH 3.9 using precipitant (b) shown above), 22 g of lime-treated ossein gelatin subjected to the calcium removal treatment (calcium content: 150 ppm or less) was added and dispersed again at 40° C. Then, 0.39 g of 4-hydroxy-6-methyl-1,3,3a,7-tetraazaindene was added to adjust the pH to 5.9 and the pAg to 7.8, followed by chemical sensitization at 70° C. using the agents shown in Table 7. At the end of the chemical sensitization, a solution of sensitizing dye (2) and sensitizing dye (3) (each shown below) in methanol (a solution having the composition shown in Table 8) was added. After the chemical sensitization, the temperature was lowered to 40° C., and 200 g of a dispersion of stabilizer (1) in gelatin shown below was added. After sufficient stirring, the resulting product was stored. Thus, a monodisperse cubic silver chlorobromide emulsion having a coefficient of variation of 12.6% and a mean grain size of 0.25 μm was obtained. The yield of this emulsion was 938 g.

TABLE 7

| Agent Used in Chemical Sensitization | Amount Added |
| --- | --- |
| 4-Hydroxy-6-methyl-1,3,3a,7-tetraazaindene | 0.39 g |
| Triethylthiourea | 3.3 mg |
| Degradation Product of Nucleic Acid | 0.39 g |
| NaCl | 0.15 g |
| KI | 0.12 g |
| Antifoggant (2) | 0.10 g |
| Preservative (1) | 0.07 g |

Antifoggant (2)

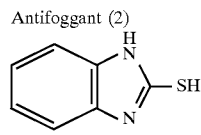

TABLE 8

| Composition of Dye Solution | Amount Added |
| --- | --- |
| Sensitizing Dye (2) | 0.12 g |
| Sensitizing Dye (3) | 0.06 g |
| p-Toluenesulfonic Acid | 0.71 g |
| Methanol | 18.7 cc |

Sensitizing Dye (2)

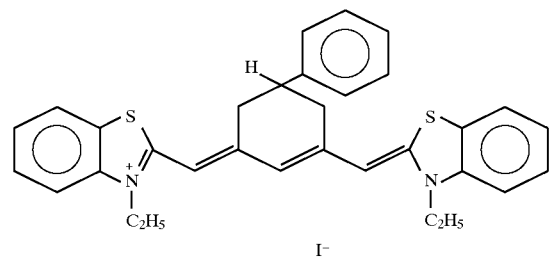

I-

Sensitizing Dye (3)

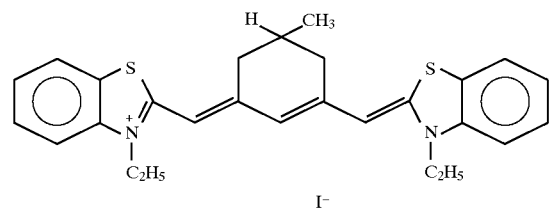

I-

Light-Sensitive Silver Halide Emulsion (3) (Emulsion for First Layer)

Solution (I) and solution (II) having the compositions shown in Table 10 were concurrently added to an aqueous solution having the composition shown in Table 9 over a period of 18 minutes with sufficient stirring. Ten minutes after that, solution (III) and solution (IV) having the compositions shown in Table 10 were added over a period of 24 minutes.

TABLE 9

| Composition | |
| --- | --- |
| $H_2O$ | 620 cc |
| Lime-Treated Gelatin | 20 g |
| KBr | 0.3 g |
| NaCl | 2 g |
| Solvent for Silver Halide (1) | 0.030 g |
| Sulfuric Acid (1 N) | 16 cc |
| Temperature | 50° C. |

TABLE 10

| | Solution I | Solution II | Solution III | Solution IV |
| --- | --- | --- | --- | --- |
| $AgNO_3$ | 30.0 g | — | 70.0 g | — |
| KBr | — | 13.7 g | — | 44.1 g |
| NaCl | — | 3.62 g | — | 2.4 g |
| $K_2IrCl_6$ | — | — | — | 0.020 mg |
| Total Amount | Water to make 180 ml | Water to make 181 ml | Water to make 242 ml | Water to make 250 ml |

After conventional washing and salt removal (conducted at pH 3.8 using precipitant (a)), 22 g of lime-treated ossein gelatin was added to adjust the pH to 7.4 and the pAg to 7.8, followed by chemical sensitization at 60° C. Compounds used in the chemical sensitization are as shown in Table 11. Thus, a monodisperse cubic silver chlorobromide emulsion having a coefficient of variation of 9.7% and a mean grain size of 0.32 μm was obtained. The yield of this emulsion was 680 g.

TABLE 11

| Agent Used in Chemical Sensitization | Amount Added |
| --- | --- |
| 4-Hydroxy-6-methyl-1,3,3a,7-tetraazaindene | 0.38 g |
| Triethylthiourea | 3.10 mg |
| Antifoggant (2) | 0.19 g |
| Preservative (1) | 0.07 g |
| Preservative (2) | 3.13 g |

Preparation of Dispersion of Colloidal Silver in Gelatin

A solution having the composition shown in Table 13 was added to an aqueous solution having the composition shown in Table 12 with sufficient stirring. Then, after washing with precipitant (a), 43 g of lime-treated ossein gelatin was added to adjust the pH to 6.3. Thus, a dispersion containing 2% silver and 6.8% gelatin was obtained. The mean grain size thereof was 0.02 μm and the yield thereof was 512 g.

TABLE 12

| Composition | |
| --- | --- |
| $H_2O$ | 620 cc |
| Dextrin | 16 g |
| NaOH (5 N) | 41 cc |
| Temperature | 30° C. |

TABLE 13

| Composition | |
|---|---|
| H$_2$O | 135 cc |
| AgNO$_3$ | 17 g |

Preparation of Dispersions of Hydrophobic Additives in Gelatin

Dispersions of a yellow dye-donating compound, a magenta dye-donating compound and cyan dye-donating compounds in gelatin were each prepared according to the formulation shown in Table 14. That is, for each dispersion, the respective oily phase components were melted by heating to form a homogeneous solution. To this solution were added the aqueous phase components heated to about 60° C., and mixed by stirring, followed by dispersing at 10000 rpm with a homogenizer for 10 minutes. Water was added thereto and stirred to obtain a homogeneous dispersion. Further, for the dispersion of cyan dye-donating compounds in gelatin, dilution with water and concentration were repeated by use of an ultrafiltration module (ACV-3050 manufactured by Asahi Chemical Industries Co., Ltd.) to decrease the amount of ethyl acetate so as to give 1/17.6 the amount of ethyl acetate shown in Table 14.

TABLE 14

| Composition of Dispersion | | | |
|---|---|---|---|
| | Yellow | Magenta | Cyan |
| Oily Phase | | | |
| Cyan Dye-Donating Compound (1) | — | — | 7.3 g |
| Cyan Dye-Donating Compound (2) | — | — | 10.7 g |
| Magenta Dye-Donating Compound (1) | — | 14.7 g | — |
| Yellow Dye-Donating Compound (1) | 12.3 g | — | — |
| Reducing Agent (1) | 0.9 g | 0.2 g | 1.0 g |
| Antifoggant (3) | 0.1 g | — | 0.2 g |
| Antifoggant (4) | — | 0.7 g | — |
| Surfactant (1) | 1.1 g | — | — |
| High Boiling Solvent (1) | 6.2 g | — | 4.6 g |
| High Boiling Solvent (2) | — | 7.4 g | 4.9 g |
| High Boiling Solvent (3) | — | — | 1.2 g |
| Dye (a) | 1.1 g | — | 0.5 g |
| Water | 0.4 ml | — | — |
| Ethyl Acetate | 9.6 ml | 50.1 ml | 55.2 ml |
| Aqueous Phase | | | |
| Lime-Treated Gelatin | 10.0 g | 10.0 g | 10.0 g |
| Calcium Nitrate | 0.1 g | 0.1 g | — |
| Surfactant (1) | — | 0.2 g | 0.8 g |
| Aqueous Solution of Sodium Hydroxide (1 N) | — | 1.9 ml | — |
| Carboxymethyl Cellulose | — | — | 0.3 g |
| Water | 26.1 ml | 139.7 ml | 95.9 ml |
| Water Added | 99.9 ml | 157.3 ml | 209.0 ml |
| Preservative (1) | 0.0004 g | 0.04 g | 0.1 g |

Preparation of Dispersion of Reducing Agent (2) in Gelatin

A dispersion of reducing agent (2) in gelatin was prepared according to the formulation shown in Table 15. That is, the respective oily phase components were melted by heating at about 60° C., and the aqueous phase components heated to about 60° C. were added to the resulting solution and mixed by stirring, followed by dispersing at 10000 rpm with a homogenizer for 10 minutes to obtain a homogeneous dispersion. Further, ethyl acetate was removed from the resulting dispersion with an evaporating apparatus which is use to remove organic solvents.

TABLE 15

| Composition of Dispersion | |
|---|---|
| Oily Phase | |
| Reducing Agent (2) | 7.5 g |
| High Boiling Solvent (1) | 4.7 g |
| Surfactant (1) | 1.9 g |
| Ethyl Acetate | 14.4 ml |
| Aqueous Phase | |
| Acid-Treated Gelatin | 10.0 g |
| Preservative (1) | 0.02 g |
| Preservative (3) | 0.04 g |
| Sodium Hydrogensulfite | 0.1 g |
| Water | 136.7 g |

Preparation of Dispersion of Stabilizer (1) in Gelatin

A dispersion of stabilizer (1) in gelatin was prepared according to the formulation shown in Table 16. That is, the respective oily phase components were melted at room temperature, and the aqueous phase components heated to about 40° C. were added to the resulting solution and mixed by stirring, followed by dispersing at 10000 rpm with a homogenizer for 10 minutes. Water was added thereto and stirred to obtain a homogeneous dispersion.

TABLE 16

| Composition of Dispersion | |
|---|---|
| Oily Phase | |
| Stabilizer (1) | 4.0 g |
| Sodium Hydroxide | 0.3 g |
| Methanol | 62.8 g |
| High Boiling Solvent (4) | 0.9 g |
| Aqueous Phase | |
| Gelatin Subjected to Calcium Removal Treatment (Ca content: 100 ppm or less) | 10.0 g |
| Preservative (1) | 0.04 g |

Preparation of Dispersion of Zinc Hydroxide in Gelatin

A dispersion of zinc hydroxide in gelatin was prepared according to the formulation shown in Table 17. That is, the respective components were mixed and dissolved, followed by dispersing in a mill using glass beads having a mean grain size of 0.75 mm for 30 minutes. Further, the glass beads were removed by separation to obtain a homogeneous dispersion. Zinc hydroxide having a mean grain size of 0.25 μm was used.

TABLE 17

| Composition of Dispersion | |
|---|---|
| Zinc Hydroxide | 15.9 g |
| Carboxymethyl Cellulose | 0.7 g |
| Polysodiuin Acrylate | 0.07 g |
| Lime-Treated Gelatin | 4.2 g |
| Water | 100 ml |
| High Boiling Solvent (4) | 0.4 g |

Preparation of Dispersion of Matte Agent in Gelatin Added to Protective Layer

A solution of PMMA in methylene chloride was added to gelatin together with a small amount of surfactant, and dispersed by stirring at high speed. Subsequently, methylene chloride was removed with an evaporating apparatus, which is used to remove organic solvents, to obtain a homogeneous dispersion having a mean grain size of 4.3 μm.

Cyan Dye-Donating Compound (1)
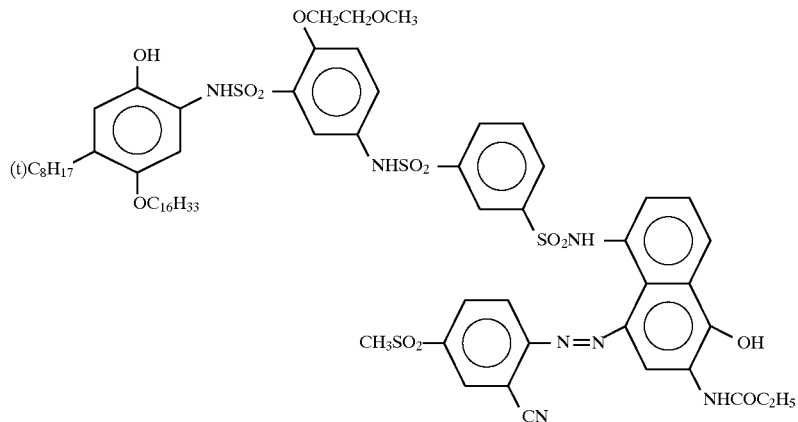
Cyan Dye-Donating Compound (2)
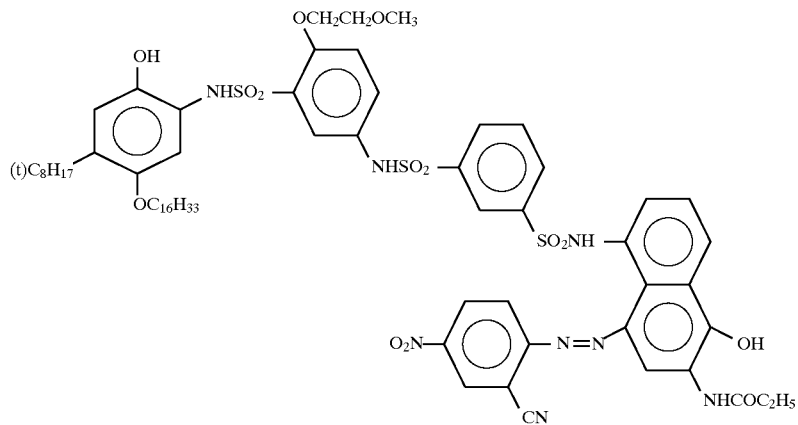
Magenta Dye-Donating Compound (1)
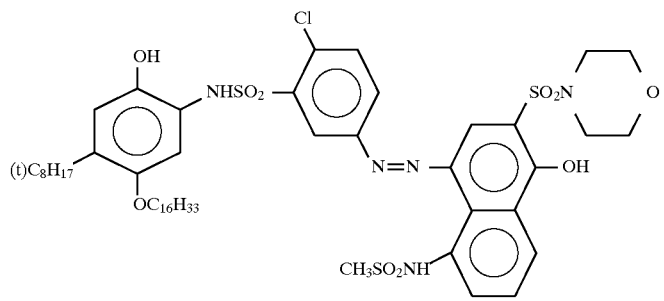

Yellow Dye-Donating Compound (1)
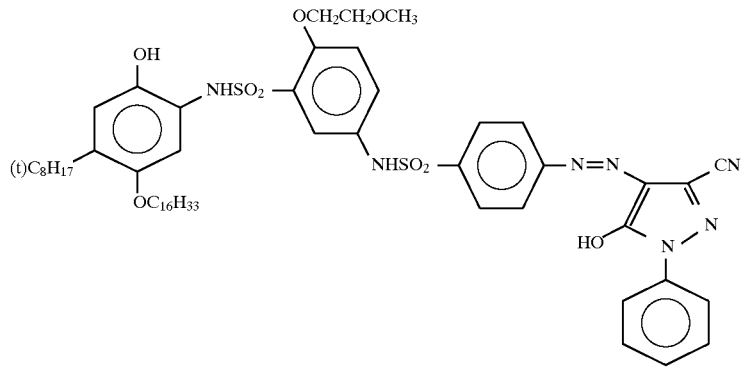
Reducing Agent (1)
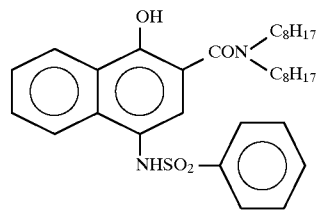
Antifoggant (3)
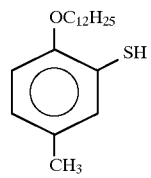
Antifoggant (4)
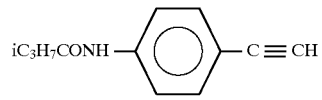
Surfactant (1)
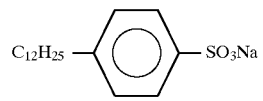
High Boiling Solvent (1)          High Boiling Solvent (2)
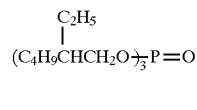          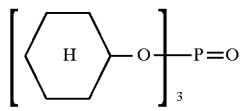
High Boiling Solvent (3)
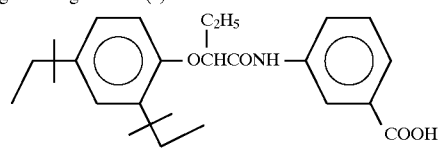

Dye (a)

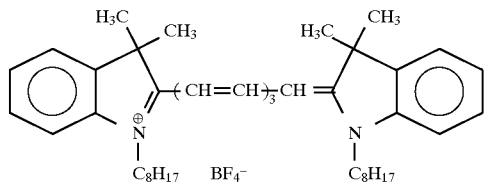

Reducing Agent (2)

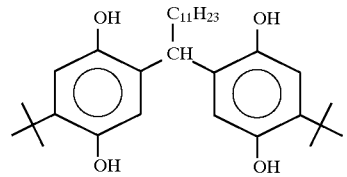

Stabilizer (1)

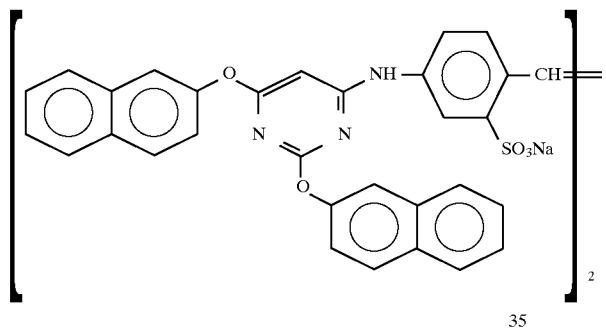

High Boiling Organic Solvent (4) (the same compound as perservative (2)).

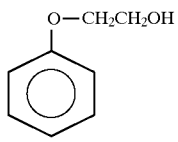

Heat developable light-sensitive material 101 shown in Table 18 was obtained using the above-described compounds.

TABLE 18

Constitution of Main Raw Materials of Heat Developable Light-Sensitive Material 101

| Layer No. | Layer Name | Additive | Amount Coated (mg/m$^2$) |
|---|---|---|---|
| 7th Layer | Protective Layer | Acid-Treated Gelatin | 442 |
| | | Reducing Agent (2) | 47 |
| | | High Boiling Solvent (1) | 30 |
| | | Colloidal Silver Grains | 2 |
| | | Matte Agent (PMMA Resin) | 17 |
| | | Surfactant (2) | 16 |
| | | Surfactant (1) | 9 |
| | | Surfactant (3) | 2 |
| 6th Layer | Intermediate Layer | Lime-Treated Gelatin | 862 |
| | | Zinc Hydroxide | 480 |
| | | Water-Soluble Polymer (1) | 4 |

TABLE 18-continued

Constitution of Main Raw Materials of Heat Developable Light-Sensitive Material 101

| Layer No. | Layer Name | Additive | Amount Coated (mg/m$^2$) |
|---|---|---|---|
| | | Surfactant (2) | 0.4 |
| | | Calcium Nitrate | 14 |
| 5th Layer | Red-Sensitive Layer | Lime-Treated Gelatin | 452 |
| | | Light-Sensitive Silver Halide Emulsion (1) | 301 (in terms of silver) |
| | | Magenta Dye-Donating Compound (1) | 441 |
| | | High Boiling Solvent (2) | 221 |
| | | Reducing Agent (1) | 6 |
| | | Antifoggant (4) | 20 |
| | | Surfactant (1) | 0.3 |
| | | Water-Soluble Polymer (1) | 11 |
| 4th Layer | Intermediate Layer | Lime-Treated Gelatin | 485 |
| | | Zinc Hydroxide | 270 |
| | | Water-Soluble Polymer (1) | 2 |
| | | Surfactant (2) | 0.3 |
| | | Calcium Nitrate | 8 |
| 3rd Layer | Second Infrared-Sensitive Layer | Lime-Treated Gelatin | 373 |
| | | Light-Sensitive Silver Halide Emulsion (2) | 106 (in terms of silver) |
| | | Stabilizer (1) | 9 |
| | | Cyan Dye-Donating Compound (2) | 233 |
| | | Cyan Dye-Donating Compound (1) | 159 |

TABLE 18-continued

Constitution of Main Raw Materials of Heat Developable Light-Sensitive Material 101

| Layer No. | Layer Name | Additive | Amount Coated (mg/m²) |
|---|---|---|---|
| | | Dye (a) | 10 |
| | | High Boiling Solvent (1) | 101 |
| | | High Boiling Solvent (2) | 108 |
| | | High Boiling Solvent (3) | 27 |
| | | Reducing Agent (1) | 22 |
| | | Antifoggant (3) | 4 |
| | | Surfactant (1) | 0.9 |
| | | Carboxymethyl Cellulose | 5 |
| | | Water-Soluble Polymer (1) | 11 |
| 2nd Layer | Intermediate Layer | Lime-Treated Gelatin | 438 |
| | | Surfactant (2) | 4 |
| | | Surfactant (4) | 123 |
| | | Water-Soluble Polymer (2) | 26 |
| | | Antifoggant (5) | 6 |
| | | Calcium Nitrate | 8 |
| 1st Layer | First Infrared- | Lime-Treated Gelatin | 587 |
| | | Light-Sensitive Silver Halide Emulsion (3) | 311 (in terms of silver) |
| | Sensitive Layer | Stabilizer (1) | 8 |
| | | Yellow Dye-Donating Compound (1) | 504 |
| | | Sensitizing Dye (4) | 0.1 |
| | | Dye (a) | 44 |
| | | High Boiling Solvent (1) | 252 |
| | | Reducing Agent (1) | 35 |
| | | Antifoggant (3) | 4 |
| | | Surfactant (1) | 32 |
| | | Water-Soluble Polymer (1) | 46 |
| | | Hardener (1) | 45 |

Support: Paper Support Laminated with Polyethylene (having a a thickness of 96 μm)

Note:
Trace additives such as preservatives are omitted.

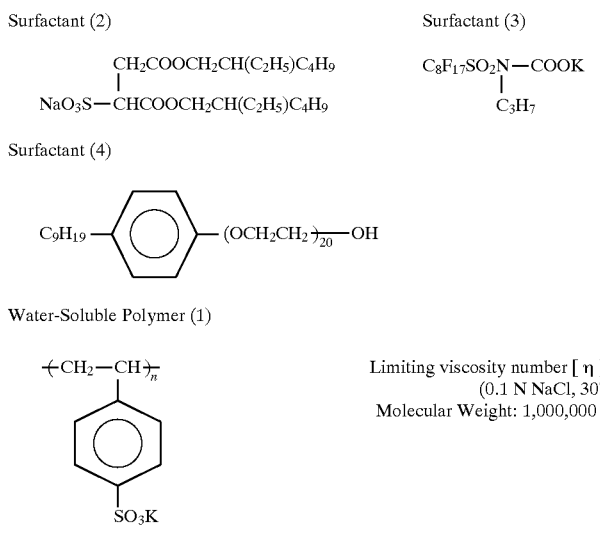

Surfactant (2)

$$NaO_3S-\underset{\underset{CH_2COOCH_2CH(C_2H_5)C_4H_9}{|}}{CHCOOCH_2CH(C_2H_5)C_4H_9}$$

Surfactant (3)

$$C_8F_{17}SO_2N-COOK$$
$$\underset{C_3H_7}{|}$$

Surfactant (4)

$$C_9H_{19}-\text{C}_6\text{H}_4-(OCH_2CH_2)_{20}-OH$$

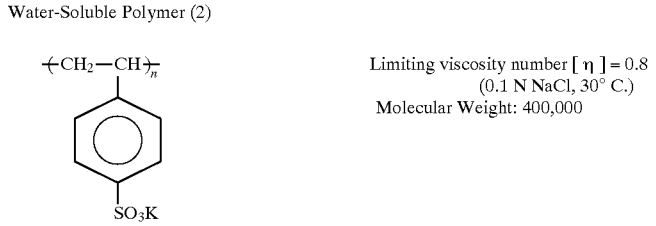

Water-Soluble Polymer (1)

$-(CH_2-CH)_n-$ with phenyl-SO₃K

Limiting viscosity number [η] = 1.6 (0.1 N NaCl, 30° C.)
Molecular Weight: 1,000,000

Water-Soluble Polymer (2)

$-(CH_2-CH)_n-$ with phenyl-SO₃K

Limiting viscosity number [η] = 0.8 (0.1 N NaCl, 30° C.)
Molecular Weight: 400,000

Sensitizing Dye (4)

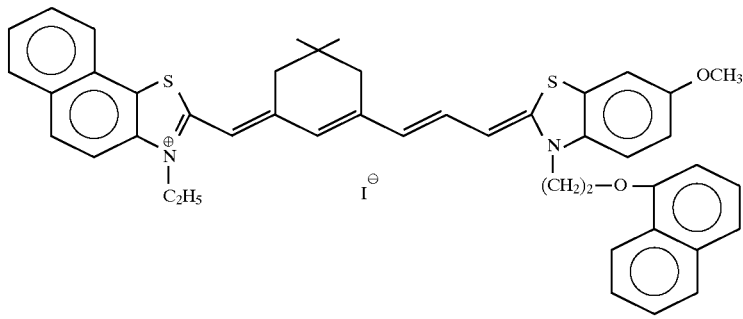

Antifoggant (5)

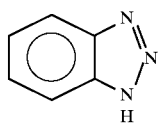

Hardener (1)

The following exposure processing and development processing were carried out to light-sensitive material 101 thus obtained.

An outer drum type exposure drum having a diameter of 34 cm (about 1 m in length) was prepared, and light-sensitive material 101 was wrapped around the surface of the drum 103 and fixed thereto. Then, using a multiple exposure head of 64 channels for each color, semiconductor lasers having color wavelengths of 680 nm, 750 nm and 810 nm were each allowed to emit light continuously to expose the light-sensitive material at a resolution of 600 dpi.

Paper PGSG for Fujix Pictrography 3000 manufactured by Fuji Photo Film Co., Ltd. was used as a dye fixing material, and a Fujix Pictrography 3000 device manufactured by Fuji Photo Film Co., Ltd. was used as a heat development device to develop the light-sensitive material under the standard development conditions.

Results of the above-described exposure and development are shown in Table 19. In Table 19, images formed by exposure and development by changing the number of revolution of the drum, the sub-scanning feed per revolution of the drum an d the intervals of multiple exposure are compared for exposure streaks at both ends, the enlargement of the exposure range due to the difference in exposure temperature (exposure temperature dependency), the enlargement of the exposure range for correcting exposure streaks, and the enlargement of the exposure range due to the enlargement of the exposure range for correcting the exposure temperature dependency and exposure streaks, with regard to a monobeam exposure pattern, conventional multiple-beam exposure pattern A, and multiple-beam exposure patterns B and C according to the present invention.

TABLE 19

| Exposure Pattern | Number of Revolution of Drum rpm | Sub-scanning Feed (per Revolution of Drum) | Interval of Multiple Exposure | Exposure Streaks (Both Ends of Multiple Beams) | Exposure Temperature Dependency (Difference in Sensitivity between 15° C. and 30° C. | Enlargement of Exposure Range for Correcting Exposure Streaks | Enlargement of Exposure Range | Remark |
|---|---|---|---|---|---|---|---|---|
| Monobeam | 150 | X1 (1 ch) | 0.4 sec | None | 0.04 | 0 | 0.04 | Reference |
| Multiple-Beam A | 150 | X1 (64 ch) | No multiple exposure (0.4 sec only at exposure points at both ends) | Strong | 0.20 | 0.20 | 0.40 | Comparison |
| Multiple-Beam A | 300 | X1 (64 ch) | No multiple exposure (0.2 sec only at exposure points at both ends) | Strong | 0.23 | 0.20 | 0.43 | Comparison |

TABLE 19-continued

| Exposure Pattern | Number of Revolution of Drum rpm | Sub-scanning Feed (per Revolution of Drum) | Interval of Multiple Exposure | Exposure Streaks (Both Ends of Multiple Beams) | Exposure Temperature Dependency (Difference in Sensitivity between 15° C. and 30° C. | Enlargement of Exposure Range for Correcting Exposure Streaks | Enlargement of Exposure Range | Remark |
|---|---|---|---|---|---|---|---|---|
| Multiple-Beam B | 300 | X½ (32 ch) | 0.2 sec | Somewhat strong | 0.10 | 0.10 | 0.20 | Invention |
| Multiple-Beam C | 150 | X¼ (16 ch) | 0.4 sec | Weak | 0.06 | 0.05 | 0.11 | Invention |
| Multiple-Beam C | 300 | X¼ (16 ch) | 0.2 sec | Weak | 0.03 | 0.05 | 0.08 | Invention |
| Multiple-Beam C | 600 | X¼ (16 ch) | 0.1 sec | Weak | 0.02 | 0.03 | 0.05 | Invention |

As shown in Table 19, it can be understood that by using multiple-beam exposure patterns B and C, excellent image forming methods can be achieved in which the exposure streaks are decreased and the exposure temperature dependency is reduced, as compared with conventional multiple-beam exposure pattern A. Further, Table 19 shows that the methods of the present invention are excellent image forming methods narrow in the exposure range, because the enlargement of the exposure range is decreased. FIG. 19 also indicates that no multiple exposure effect is achieved at exposure points other than those at both ends in exposure pattern A, even if the number of revolution of the drum is doubled, rather resulting in deterioration of the exposure temperature dependency.

As described above, according to the present invention, the exposure time can be decreased by multiple-beam exposure, and the difference in exposure conditions caused by the exposure position can be decreased, even when the multiple-beam exposure is employed. Accordingly, exposure steaks can be decreased, and the exposure temperature dependency can be reduced. The exposure range can therefore be narrowed.

While the invention has been described in detail and with reference to specific examples thereof, it will be apparent to one skilled in the art that various changes and modifications can be made therein without departing from the spirit and scope thereof.

What is claimed is:

1. An image forming method comprising the steps of:

rotating a drum having wound thereon a heat developable light-sensitive material which comprises a support having thereon at least a light-sensitive silver halide emulsion, a binder and a dye-donating compound;

exposing said heat developable light-sensitive material with an exposure head comprising a plurality of beam light sources which are arranged at a predetermined interval along a sub-scanning direction perpendicular to a main scanning direction in which the drum is rotated, to correspond to a plurality of exposure points, respectively, and each of which emits light having the same wavelength; and moving said exposure head in said sub-scanning direction by 1/N of the length of the arrangement of said beam light sources, wherein N is an integer equal to 2 or greater, to effect a scanning exposure of said heat developable light-sensitive material in steps of a plurality of exposure points.

2. The image forming method as claimed in claim 1, wherein said heat developable light-sensitive material comprises at least one layer light-sensitive to an infrared wavelength region of 700 nm to 900 nm.

3. The image forming method as claimed in claim 1, wherein said heat developable light-sensitive material is a heat developable color light-sensitive material, wherein said exposing forms a color image.

4. The image forming method as claimed in claim 1, wherein N is an integer equal to 4 or greater.

5. The image forming method as claimed in claim 1, wherein each of said exposure points are exposed at least twice in multiple ways at an interval of from 2 msec to 1000 msec.

6. The image forming method as claimed in claim 1, wherein each of said exposure points are exposed at least twice in multiple ways at an interval of from 10 msec to 400 msec.

7. The image forming method as claimed in claim 1, wherein each of said exposure points are exposed at least 4 times in multiple ways at an interval of from 10 msec to 400 msec.

8. The image forming method as claimed in claim 1, wherein each of said exposure points are exposed while adjusting the exposure amounts by time modulation.

* * * * *